US012210726B1

United States Patent
Loo et al.

(10) Patent No.: US 12,210,726 B1
(45) Date of Patent: Jan. 28, 2025

(54) SYSTEM, METHOD, AND APPLICATION PROGRAMMING INTERFACE FOR IMPLEMENTING CLOUD-BASED DEVICE CONTROL

(71) Applicant: CONCENTRIX CVG CUSTOMER MANAGEMENT GROUP INC., Cincinnati, OH (US)

(72) Inventors: Tipton Loo, Redmond, WA (US); Dennis W. Read, Bellevue, WA (US); Joseph D. Bond, Sammamish, WA (US)

(73) Assignee: CONCENTRIX CVG CUSTOMER MANAGEMENT GROUP INC., Cincinnati, OH (US)

(*) Notice: Subject to any disclaimer, the term of this patent is extended or adjusted under 35 U.S.C. 154(b) by 0 days.

(21) Appl. No.: 16/777,739

(22) Filed: Jan. 30, 2020

Related U.S. Application Data

(60) Provisional application No. 62/799,587, filed on Jan. 31, 2019.

(51) Int. Cl.
| | |
|---|---|
| *G06F 3/0482* | (2013.01) |
| *G16Y 30/00* | (2020.01) |
| *G16Y 40/10* | (2020.01) |
| *G16Y 40/20* | (2020.01) |
| *G16Y 40/35* | (2020.01) |
| *H04L 43/0817* | (2022.01) |
| *H04L 67/00* | (2022.01) |

(Continued)

(52) U.S. Cl.
CPC ............ *G06F 3/0482* (2013.01); *G16Y 30/00* (2020.01); *G16Y 40/10* (2020.01); *G16Y 40/20* (2020.01); *G16Y 40/35* (2020.01); *H04L 43/0817* (2013.01); *H04L 67/125* (2013.01); *H04L 67/34* (2013.01); *H04W 4/70* (2018.02)

(58) Field of Classification Search
CPC ........ G16Y 40/35; G16Y 40/10; G16Y 30/00; G16Y 40/20; H04W 4/70; G06F 3/0482; H04L 43/0817; H04L 67/125; H04L 67/34
USPC ......................................................... 709/223
See application file for complete search history.

(56) References Cited

U.S. PATENT DOCUMENTS

| | | | |
|---|---|---|---|
| 2018/0034914 A1* | 2/2018 | Christopher | H04W 12/06 |
| 2018/0054490 A1* | 2/2018 | Wadhwa | G08G 1/0129 |

(Continued)

*Primary Examiner* — Suraj M Joshi
*Assistant Examiner* — Ayele F Woldemariam
(74) *Attorney, Agent, or Firm* — Dority & Manning, P.A.

(57) ABSTRACT

A framework and a method provided for monitoring and managing IoT devices. The method includes providing a cloud- and device-agnostic IoT cloud platform that interfaces with applications, IoT management platforms, and IoT device controllers. Each IoT management platform manages one or more IoT device controllers, and each IoT device controller controls a respective IoT device. The method includes receiving a request for performing a transaction corresponding to an IoT device from an application. In response to receiving the request, the method includes generating a set of operation commands for performing the transaction through an IoT management platform. The set of operation commands is generated based on a set of configurations associating the transaction to the IoT management platform. The method also includes triggering performance of the transaction by issuing the set of operation commands to the IoT management platform.

21 Claims, 23 Drawing Sheets

(51) Int. Cl.
*H04L 67/125* (2022.01)
*H04W 4/70* (2018.01)

(56) References Cited

U.S. PATENT DOCUMENTS

| | | | | |
|---|---|---|---|---|
| 2019/0149361 A1* | 5/2019 | Sarwar | .................... | H04L 41/08 370/254 |
| 2019/0149599 A1* | 5/2019 | Bartfai-Walcott | .... | H04L 67/125 709/226 |
| 2019/0182333 A1* | 6/2019 | Bartfai-Walcott | ...... | H04L 47/70 |
| 2019/0245713 A1* | 8/2019 | Lo | ........................ | H04L 63/0428 |
| 2019/0327152 A1* | 10/2019 | Shemer | ................. | H04L 43/022 |
| 2020/0177671 A1* | 6/2020 | Tofighbakhsh | ..... | H04L 67/1002 |
| 2020/0389528 A1* | 12/2020 | Ha | .......................... | H04L 67/12 |

* cited by examiner

Figure 9

SYSTEM, METHOD, AND APPLICATION PROGRAMMING INTERFACE FOR IMPLEMENTING CLOUD-BASED DEVICE CONTROL

PRIORITY CLAIM AND RELATED APPLICATION

The application claims the benefit of U.S. Provisional Application No. 62/799,587, filed Jan. 31, 2019, the content of which is incorporated herein in its entirety.

TECHNICAL FIELD

The present disclosure relates generally to Internet-of-Things (IoT) cloud platforms, and more specifically to systems, methods, and APIs for implementing cloud-based device control.

BACKGROUND

Adoption of Internet-of-Things (IoT) and cloud computing continue to accelerate. Rapid advances have resulted in divergent technologies. Enterprise companies continue to face an uphill task in integrating such technologies into legacy systems. Lack of standards causes a lock-in effect and prevents businesses from experimenting with or switching to alternative solutions. For example, public/commercial cloud IoT platforms provide end-to-end IoT management solutions, but once such frameworks are deployed, it is difficult for companies to port their applications, management, and/or monitoring of IoT devices. The plethora of device types also adds to the complexity of IoT management platforms.

SUMMARY

The present disclosure describes a system, method, and API that address at least some of the shortcomings of conventional single or dedicated cloud IoT management systems. Systems and methods are provided for a cloud- and device-agnostic IoT cloud platform that makes it easier for companies to adopt and manage cloud-based IoT solutions. In some embodiments, abstraction layers help hide the complexity in managing a multi-cloud and multi-device environment. Configurable interfaces can be easily extended to support different IoT devices and/or cloud platforms. In some embodiments, intuitive graphical user interfaces provide enterprise companies real-time operational views, and/or the ability to experiment with different cloud technologies. In some embodiments, proxy devices provide network connectivity for legacy systems.

In accordance with some embodiments, a method is provided for monitoring and managing IoT devices. The method includes providing a cloud- and device-agnostic as well as multi-cloud capable IoT device management platform that interfaces with a plurality of applications, a plurality of commercial cloud and non-cloud IoT management platforms, and a plurality of IoT device controllers. Each IoT management platform manages one or more IoT device controllers, and each IoT device controller controls one or more respective IoT devices depending on the capability of the controller used. Example controllers include off-the-shelf device handlers, such as Raspberry Pi or similar devices. The method includes receiving a first request for performing a first transaction corresponding to a first IoT device from a first application. In response to receiving the first request, the method includes generating a first set of operation commands for performing the first transaction in accordance with a first IoT management platform to manage a first IoT device controller that controls the first IoT device. The first set of operation commands is generated based on a first set of configurations associating the first transaction to the first IoT management platform. The method also includes triggering performance of the first transaction by issuing the first set of operation commands to the first IoT management platform through an interface between the cloud- and device-agnostic IoT cloud platform and the first IoT management platform. Other features of the method are described in the description of embodiments.

In accordance with some implementations, an electronic device has one or more processors and memory storing one or more programs executable by the one or more processors. The one or more programs include instructions for performing any of the methods described herein.

In accordance with some implementations, a non-transitory computer-readable storage medium has one or more processors and memory storing one or more programs executable by the one or more processors. The one or more programs include instructions for performing any of the methods described herein.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

FIGS. 4-10B illustrate example user interfaces generated by the framework shown in FIG. 1, according to some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

It will also be understood that, although the terms first, second, etc. are, in some instances, used herein to describe various elements, these elements should not be limited by these terms. These terms are used only to distinguish one element from another.

Example Cloud-Based IoT Management Framework

Figure 1:
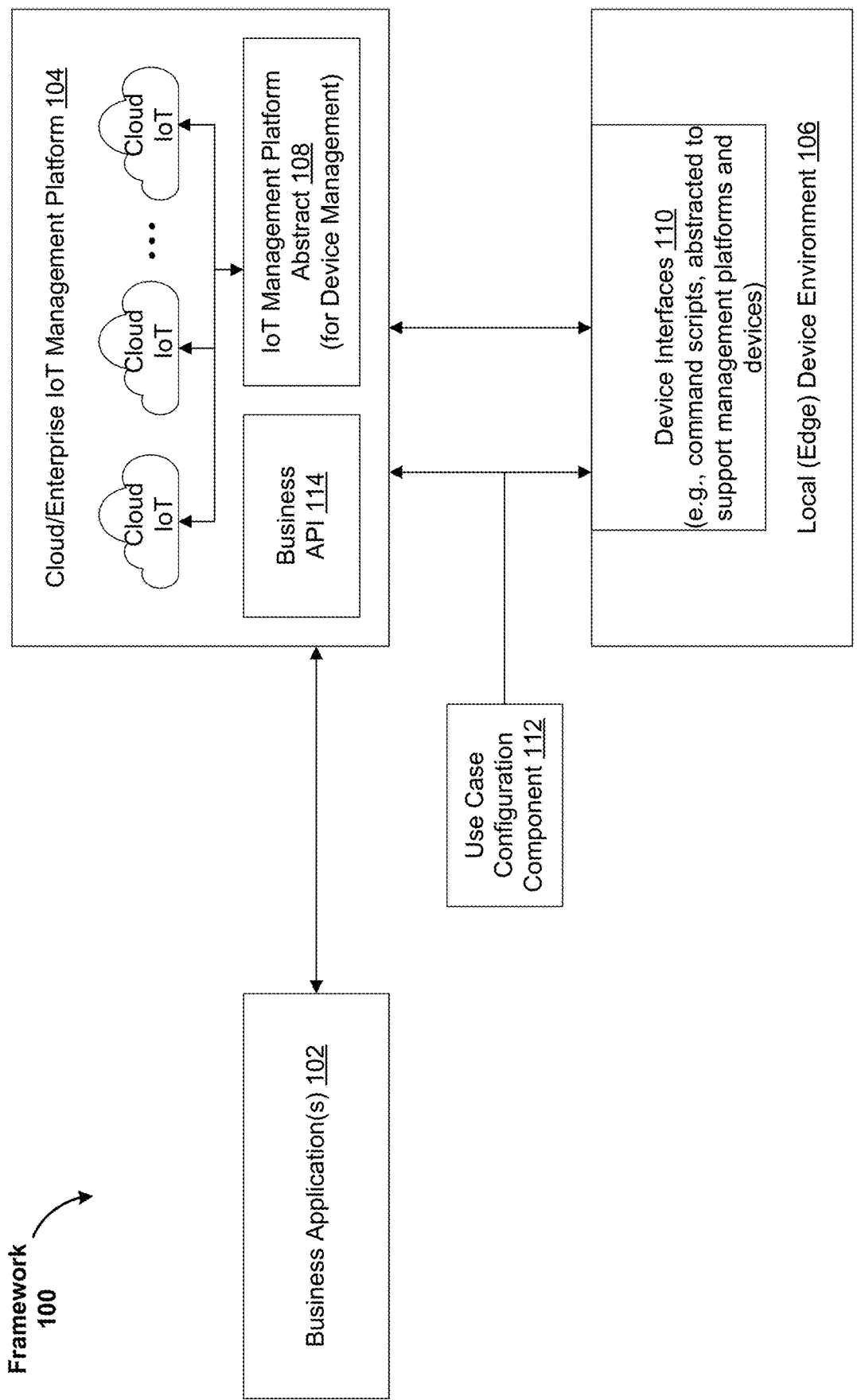
FIG. 1 illustrates a block diagram of a cloud-based IoT management framework, according to some embodiments.

FIG. 1 illustrates a block diagram of a cloud-based IoT management framework 100, according to some embodiments. The framework 100 includes the following components: cloud/enterprise IoT management platform 104, business application(s) 102, and local (edge) device environment 106. Although some business applications 102 include the IoT management platform to control a device, it is typically more structured and is a best practice to use an IoT management platform that is separate from the business application to manage those devices (in the device environment), unless those business applications are highly specific to the devices or if there is a compliance/regulatory requirement that prohibits the use of a separate (or third party) IoT management platform. Examples of IoT management platforms (cloud-based IoT providers) include Amazon Web Services (AWS), Microsoft Azure, and Google Cloud Platform (GCP), or on-premises solutions, such as Eclipse Kapua.

In some embodiments, the framework 100 covers several aspects of an IoT lifecycle including: device preparation (e.g., imaging, provisioning, and configuration), device gateway/agent and supporting services, backend IoT services and portal, end to end security, and/or monitoring, auditing, logging, metrics, and system management.

In the following description, an Application Programming Interface (API) refers to a software communication and control protocol or standard that allows two distinct software to communicate with each other. APIs can also include software that sits on native hardware (e.g., devices). A dumb device refers to a device in the IoT architecture to be managed without its own networking (communication) stack. Such devices require a proxy (external controller) to translate business instructions to low-level commands to control or monitor the status of these devices. General Purpose Input Output (GPIO) refers to an input output interface for hardware (circuit board). Human Interface Device (HID) is a low-level API protocol standard that allows device to communicate with each other. Internet of Things (IoT) generally refers to the concept relating to management of devices (smart or dumb) in a coherent architecture to derive insights out of the data being generated by these devices. Smart device refers to a device in the IoT architecture to be managed with its own networking (communication) stack and hence can be controlled directly from the IoT management framework to run commands (based on business requirements). Universal Serial Bus (USB) refers to a communication mechanism or pipe that allows components to talk to each other.

Although a specific use case (for a specific cloud IoT management framework and a specific 'dumb' device) is used for ease of explanation, the framework extends to other devices and cloud frameworks. Some embodiments use the framework as a generic accelerator framework (IoT provider and device agnostic) driven by proprietary interface controls (e.g. APIs).

Business Application

The business application 102 makes use of the device as part of a functional transaction provided by the business application according to some embodiments. An example of a business transaction is a point-of-sale application, a smart-irrigation application, a smart home application, or a smart-maintenance application. This application is used by an end-user or a computer program to cause performance of a selected functional transaction at a remote IoT device, optionally, with specified parameters.

Cloud/Enterprise IoT Management Platform

In some embodiments, the platform 104 includes IoT Management software that serves as a middle layer between the Business Application 102 and the Local (Edge) Device Environment 106. This can include platforms like AWS IoT, Azure IoT, Watson IoT, Google Cloud IoT, SAP Cloud Platform for IoT, Salesforce IoT, ThingWorx IoT Platform, Bosch IoT Suite, Cisco IoT Cloud Connect, or a proprietary platform, etc.

Local (Edge) Device Environment

In some embodiments, the local (edge) device environment 106 includes device communication stack as well as the interface and interface management of those devices. Examples include device-native USB-HID commands, GPIO, etc.

Example IoT Device Control Architecture

The example framework 100 is used for managing multiple IoT devices with multiple IoT Management Platform, according to some embodiments. The framework 100 allows enterprise companies to accelerate delivery of IoT solutions by codifying what's 'common' and making the differences 'pluggable'. The differences come from three realms: general problem class (e.g., telemetry, surveillance, process control, etc.), cloud provider, and device type. The differences map to the Business Application, Cloud/Enterprise IoT Management Platform, and Local (Edge) Environment as described above. There are many problem classes, cloud providers, and device types, but the solutions which connect them share several patterns. These patterns form the basis of the 'common' part of the framework 100 so that for every new use case/device/management platform, enterprises do not have to re-write the code to 'plumb' the respective software components.

In some embodiments, the framework 100 includes an abstraction 108 of the public (or private) IoT Management Platforms 104 as well as an abstraction 110 of the device interfaces using the IoT Management Platforms 104.

In some embodiments, the framework 100 is a generic IoT device control architecture that allows enterprise companies to build an IoT application that is tailored to the companies' use case which includes the cloud/enterprise IoT management platform(s) 104 and the device(s) 106. In some embodiments, the devices 106 are interfaceable through supported interfaces such as GPIO, USB-HID, etc. For devices without its own network communication stack, in some embodiments, the framework 100 provides the ability to use a proxy or controller, such as a Raspberry Pi that runs an agent that supports the abstraction 110 of the device interfaces.

In some embodiments, the framework 100 or generic IoT device control architecture includes the 'common' attributes and functionalities that exists across all IoT management platforms and devices (including device controllers) pre-defined (e.g., as parameters or configurations). In some embodiments, the differences are codified or parametrized and input to the framework 100.

Some embodiments include deployment functionalities, such as device registration, configuration(s) to set up commands to IoT devices, configuration(s) to set up a virtual representation of the IoT device ecosystem (device shadow/digital twin), security, and/or deployment scripts.

Use Case Configuration Component

In some embodiments, the component 112 allows an enterprise user to configure and instantiate an instance of the framework 100 to work with the specific use case, IoT Management Platform 104, and devices 106. Examples include type of device interface (e.g. USB-HID, GPIO, etc.) and corresponding native commands and/or description, IoT management platform concepts, commands, and interface mappings to the framework's.

IoT Management Platform Abstract (for Device Management)

In some embodiments, the abstract 108 is an abstraction of various IoT management platforms (e.g., Azure IoT, Google Cloud IoT, AWS IoT, etc.). For example, this includes standardized commands and output that will be translated to and from each IoT management platform commands and output.

Device Command Scripts

In some embodiments, the abstracts of device interfaces 110 is a collection of device command scripts for the devices 106. This typically includes device-native commands as well as normalization scripts or parsers to translate the device-native output/data into a normalized format for the framework. An example of this would be the USB-HID commands to open a cash drawer that is native to the manufacturer and its mapping to the framework's generic classes (open/on vs close/off), etc.

In some embodiments, this includes device-level translations of the IoT management platforms' 104 commands that are managing the devices. An example of this would be the cloud native (e.g., Azure) IoT management scripts used for managing the devices.

Business API

In some embodiments, the business API 114 is a collection of business APIs that perform the following functions:
1. Translate the business instructions from the Business Application into internal commands that are mapped to the respective IoT Management Platform and the respective devices for the use case. Commands may include an action to turn off-and-on a device, or to status a device for telemetry data; and
2. Translate device-native and IoT Management Platform native responses to a normalized response for the Business Application.

Implementation Patterns

In some embodiments, the framework 100 uses a catalog for various business use cases, IoT management providers, and devices. In some embodiments, the catalog is mapped to the use case configuration component 112, the business API 114, the IoT management platform abstract 108 for device management, and device command scripts 110. In some embodiments, the catalog includes the following items:
Representative use cases across the IoT solution life cycle
  Device preparation
    This include provisioning, security, registration, and activation of the devices involved in the specific use case
  Application configuration
    Binding business requirements to device data and behavior
  Business function execution
    Querying and collecting device state
    Commanding devices
  Diagnostics
    End to end tracing
  Analytics
    Examining and analyzing device data trends either live (streaming data) or persisted (over time)
  Maintenance
    Firmware upgrades
    Device replacement process
  Retirement
    Device deactivation process
Abstract base classes and implementations supporting 'common' behaviors. Some embodiments include placeholders for 'pluggable' variations.
Concrete implementations for 'pluggable' behavior, grouped by:
  Problem classes (cash tender transaction, temperature control, etc.)
  Cloud provider implementations (Azure, Google, AWS, etc.)
  Device types (cash registers, sensors, etc.)
Security Patterns
  This section describes security patterns leveraged and applied within the framework 100, including secured provisioning lifecycle, and device security and secured networking, according to some embodiments.
Secured Provisioning Lifecycle At the core of end to end security (for an IoT platform and lifecycle) is provisioning, via authentication (e.g., who or what has access to the system) and authorization (e.g., who or what has access to what within the system). Authentication is typically part of some type of identity management system and includes traditional username and/or service principal names and their means to authenticate including password, token, and certificate-based mechanisms. Authorization covers access controls and permissions of specific resources within the system which can typically include traditional resources like files and databases tables etc.

For IoT providers, some embodiments use mechanisms for authentication on IoT devices, such as token/key and x.509 certificate-based mechanisms, as part of the creation/provision process. For token-based authentication, in some embodiments, the IoT provider generates a unique token (similar to an API token) that a device then uses to access the IoT platform to update and receive changes about the twin/shadow state. For certificate-based authentication, in some embodiments, the IoT platform issues certificates based on a root certificate authority, either provided by the IoT platform or issued by the framework 100. In some embodiments, the means of authentication is certificate-based access that makes use of a robust public key cryptography and certificate chain of trust generation. Some embodiments resort to token-based access where simplicity is required, as an option, or as required by the IoT provider.

In some embodiments, each IoT provider has a different device and access model but has similar structure and properties in representing devices and endpoint gateways. In some embodiments, the framework 100 provides automation and abstractions to handle these variances across the IoT providers (sometimes called IoT management platforms 104). In some embodiments, there is a notion of parent endpoint/gateway entities fronting the actual child physical devices.

Some embodiments use the following process to provision a device 106 and give the device access permission to AWS IoT services (AWS IoT Core).

1. Create a thing type for the type of devices being created.
2. Create a thing group to house these devices.
3. Create an access policy for device access permissions.
4. Create a logical parent endpoint (gateway) with a x.509 certificate issued by the AWS IoT platform.
5. Attach the access policy to the parent endpoint gateway.
6. Create one or more things to represent the actual devices.
7. Add the devices to the thing group.
8. Add the thing to the logical parent endpoint gateway.

For Azure, some embodiments use the following process to provision a device 106 and give the device access permissions to Azure IoT services (Azure IoT Hub).

1. Create an IoT Hub to house the devices.
2. Create a x.509 certificate authority.
3. Add x.509 certificate authority to IoT Hub.
4. Create a parent edge gateway device identity with shared private key (token). x.509 certificates not currently supported for parent edge gateway devices.
5. For each child device, create a device x.509 certificate.
6. Create each child device identity associating the x.509 certificate.
7. Add the child device identity to the parent device identity.

For GCP, some embodiments use the following process to provision a device 106 and give the device access permissions to GCP IoT services (Google Cloud IoT Core).

1. Create a project for IoT resources.
2. Enable IoT API service.
3. Create IoT device registry under project to house devices.
4. Create an x.509 certificate to associate to parent gateway device.
5. Create parent gateway device with x.509 certificate.
6. For each child device, create an x.509 certificate.
7. Create each child device with x.509 certificate.
8. Bind each child device to the parent gateway.

Device and Networking Security

This section covers security localized to a device 106. This includes the following aspects: physical access, and software hardening and testing.

Depending on the requirements of a device, some embodiments take different measures to physically secure the device. Some embodiments use Raspberry Pi devices. In some embodiments, if the particular scenario does not require physically secured requirements, only a base setup of the Pi device is used. For locking down physical access, some embodiments take different measures including: disabling physical ports (e.g., hot gluing ports), locking the device in a sealed or key access physical box, and securing devices in a restricted compartment, cabinet, or data center.

For software hardening, some embodiments apply the following techniques at various levels of the software hierarchy to minimize unauthorized access to the device. In some embodiments, the techniques include the following:

Operating System and Services Hardening
  Change configuration defaults including disabling default account and changing default passwords and weak settings.
  Disable access to root account.
  Disabling unneeded services and networking ports.
  File system and database encryption.
  Firmware Based Cryptographic Keys such as Trusted Platform Module (TPM) where available.
  Apply latest security updates and fixes.
  Restrict remote networking access including 'ssh' with key base authentication.
  Install and enable firewall with logging using services like iptables.
  Install intrusion detection services like Fail2ban.

Developing with Secured Software Approach
  Minimize software exploits/vulnerabilities such as bugs, buffer overflows, and unchecked user inputs in software components.
  Only require least amount of access to resources (principle of least privilege).
  Isolate on separate network if necessary.
  Always use encrypted networking options if available (e.g. HTTPS and encrypted versions of networking protocols).

Penetration and Vulnerability Testing
  Testing for weaknesses in software components.
  Testing attack surfaces and reducing available open ports.

Specific Example of Design and Implementation

This section describes a specific example of design and implementation, according to some embodiments. In this example, cash drawers are set up or configured to be controlled by an AWS IoT platform. In some embodiments, similar configuration techniques are used for cloud platforms, such as Amazon Web Services (AWS), Microsoft Azure, Google Cloud Platform (GCP).

At a high level, some embodiments offer a multi-cloud and multi-device IoT platform with end to end lifecycle capabilities. Some embodiments provide a RESTFUL interface to cash drawer devices, allowing a cloud-based application to query the drawer's state, and command it to open. Since some cash drawers (e.g., USB models from APG) cannot run an IoT stack, a Raspberry Pi 3B+(RP) serves as a gateway device, translating between cloud-based messages and USB HID events, according to some embodiments.

Some embodiments deploy incremental features. Some embodiments support two scenarios: using POSTMAN to query and command a drawer, and monitoring and managing the RP, its O/S, and the application.

In some embodiments, for supporting multi-cloud, the gateway agent is configured to talk to each cloud provider using cash drawers as the example device type.

Some embodiments support functional scenarios, such as control of cash drawers and other device types, via a RESTFUL endpoint. Some embodiments provide full lifecycle monitoring and management of the Raspberry Pi (RP) device as a gateway (along with other gateway platforms).

Some embodiments use Python-based implementations to support rapid development, because of Python's large ecosystem of tools and libraries. Some embodiments use other platforms and programming languages (e.g., Java for middleware).

Some embodiments promote reuse of code, by using cloud services and libraries where possible, with each IoT provider. In this way, some embodiments use modular code that is extensible for new problem or use cases rather than for addressing infrastructure issues.

Example Functional View

In some embodiments, the functional view of the framework 100 connects a RESTFUL endpoint representing a device state (e.g., a cash drawer's open/close state) and operations to a device (e.g., USB attached cash drawer).

Figure 2A:
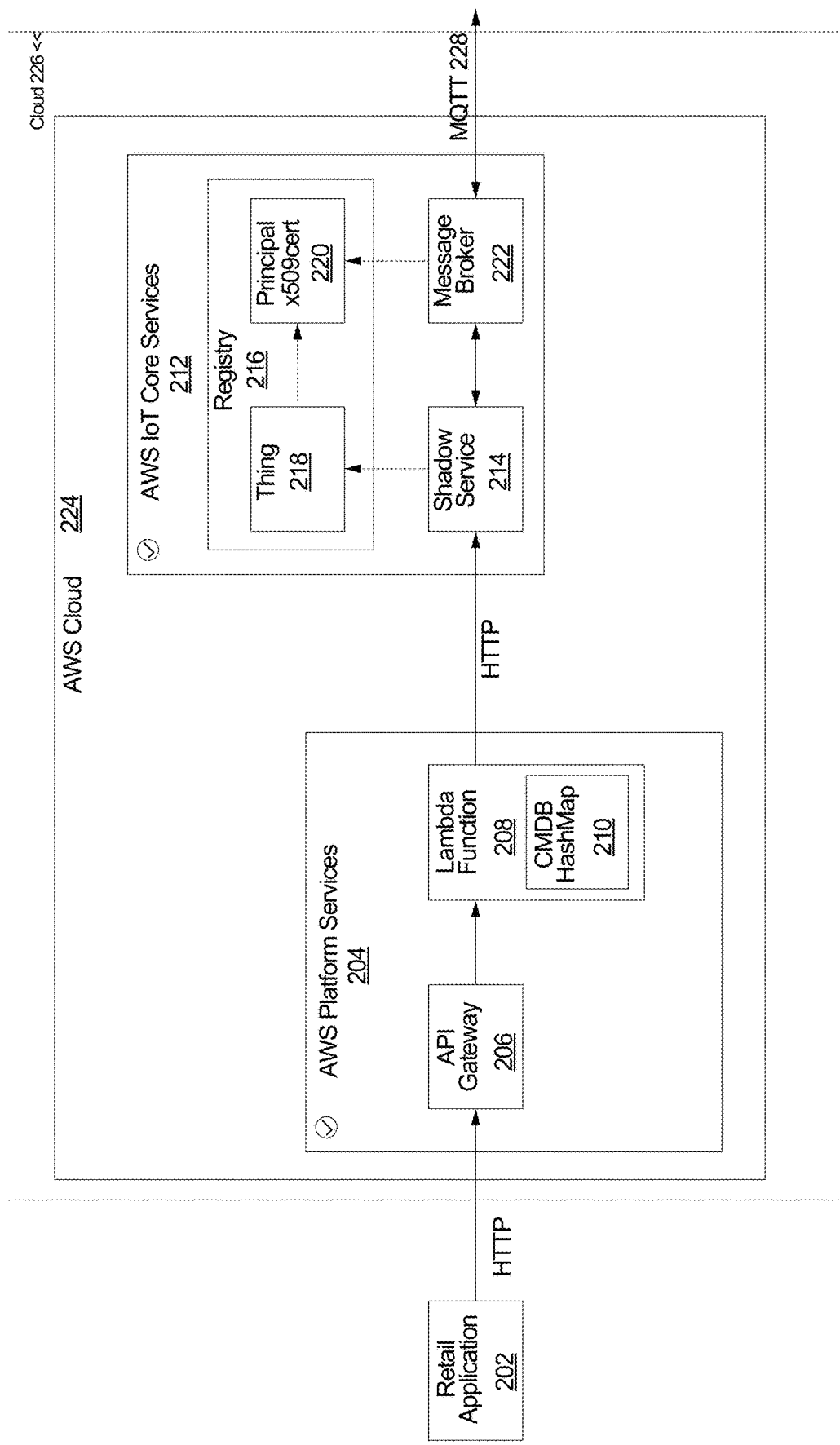
FIGS. 2A and 2B are block diagrams illustrating an example functional view of the example framework shown in FIG. 1, according to some embodiments.
Figure 2B:
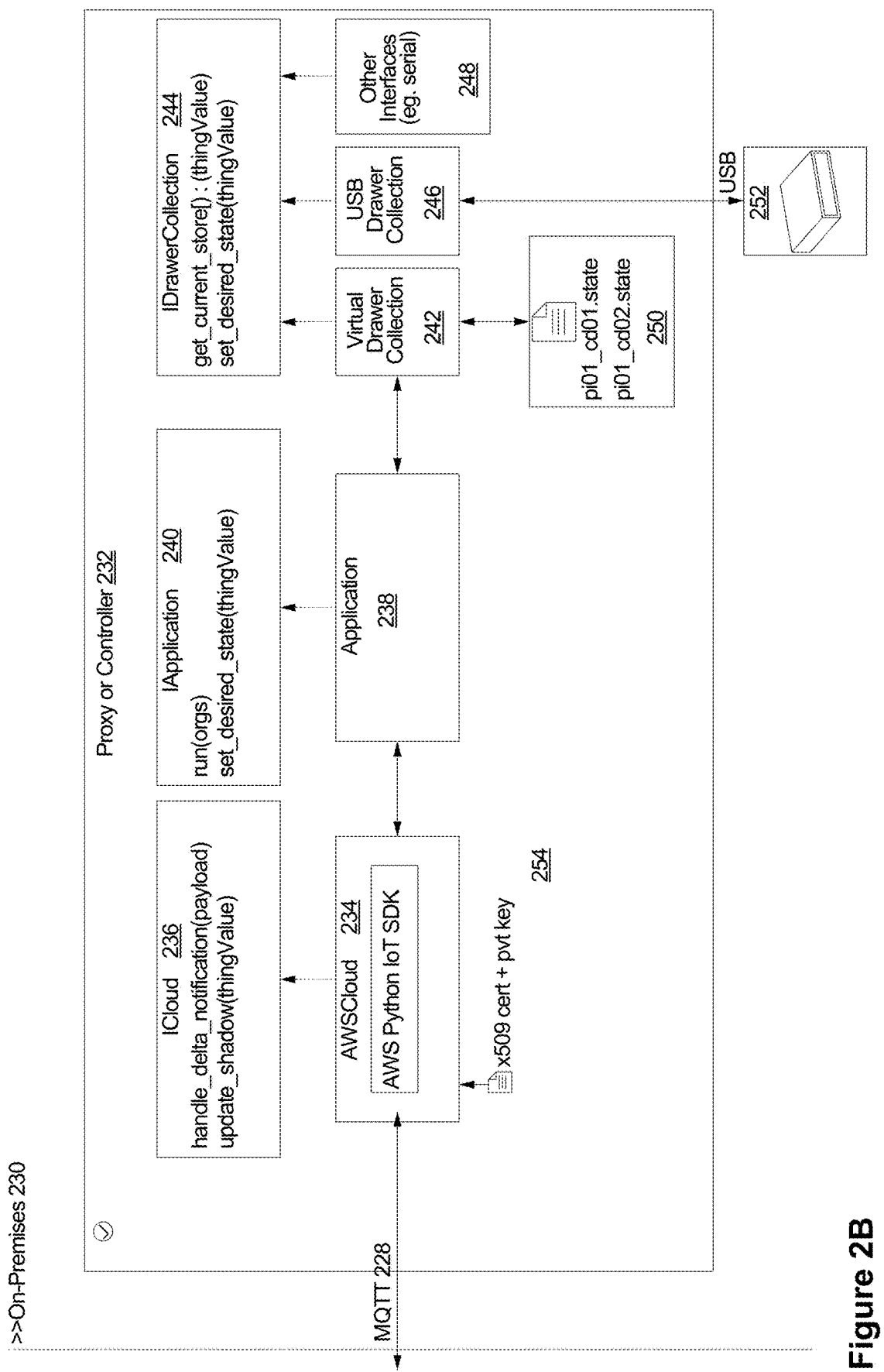

FIGS. 2A and 2B are block diagrams illustrating an example functional view of the framework 100, according to some embodiments. For the sake of illustration, the functional view is split into two figures. FIG. 2A shows the cloud related aspects 226 of the view and FIG. 2B shows the on-premises aspects 230 of the functional view. In various embodiments, the functionality described herein may be implemented in on-premises instead of the cloud (or vice versa). The cloud IoT management platform (e.g., AWS cloud 224) communicates with on-premises functionality (shown in FIG. 2B) using a MQTT 228 or similar lightweight messaging protocol for sensors and mobile devices that provides high latency and handles unreliable networks, according to some embodiments.

Referring to FIG. 2A, in some embodiments, a platform services module (e.g., AWS platform services 204) accepts HTTP requests from a retail or a business application 202. Example requests include GET/stores/[id]/drawers/[id], and POST/stores/[id]/drawers/[id], according to some embodiments. The platform service module includes an API Gateway 206 and a Lambda Function 208 module. In AWS, the Lambda Function module also includes a CMDB HashMap 210 functionality. API Gateway module 206 translates the HTTP requests to domain level APIs and outputs the APIs to the Lambda functions 208 that references a hash map (of the CMDB HashMap 210) for thing name, and places HTTP calls into IoT Shadow API (or shadow service 212), according to some embodiments. In some embodiments, each device (e.g., a cash drawer) is a thing 218, each agent (e.g., RP) is a principal 220. Access policies (e.g., registry 216 of AWS IoT core service 212) reference links between thing 218 and principal 220. In some embodiments, Shadow service 214 holds state of things 218, and a message broker 222 interacts with principal 220 (e.g., RP) via MQTT.

Referring next to FIG. 2B, on-premises 230 functionality is implemented using a proxy (sometimes called an agent) or controller 232, such as Raspberry Pi (or a similar controller) on a local LAN, according to some embodiments. Some embodiments use Python 3.5, PyUSB, and AWS IoT SDK to implement at least some of the functionalities. As shown, an AWS Cloud 234 or similar module communicates with the message broker 222 (shown in FIG. 2A) using MQTT 228. Some embodiments use Python implementations (e.g., code resident in a single file, but separates multiple interfaces contracts and multiple implementations, such as 3 interfaces and 3 implementations). An application 238 arbitrates between events raised by the cloud 226, and values queried from devices (e.g., drawers). A VirtualDrawerCollection 242 tracks state of devices in text files 250. A USBDrawer Collect module 246 manages single devices 252 (e.g., a cash drawer) using PyUSB. Some embodiments include other interfaces 248 (e.g., serial). In other words, the setup shown in FIG. 2B is extendable to support other interfaces. Some embodiments handle command line arguments including a list of things names (e.g., drawers) which a proxy (e.g., an RP) is responsible for. In some embodiments, at startup, a callback handler is registered for each device (e.g., a drawer), and stored in a dictionary. An example device 252 is a cash drawer (e.g., a APG USB Cash Drawer), according to some embodiments. In some embodiments, the device is a HID Class device that uses driver built into operating system (Raspbian). In some embodiments, the device includes two defined reports (e.g., OUT: Set drawer state (used to open), and IN: Query drawer state (returns state and drawer id)).

In the cloud (e.g., AWS cloud 224), some embodiments use API gateway and serverless functionality (e.g., AWS API Gateway 206 and AWS Lambda 208 respectively, as part of AWS platform services 204), to surface a RESTFUL endpoint. In some embodiments, a device shadow/twin provider capability (e.g., AWS IoT shadow service 214) maintains device state (e.g., drawer open/close state), and triggers events when the desired and reported states differ (e.g., an open request is needed). In some embodiments, serverless Lambda (e.g. AWS Lambda handler) maps RESTFUL requests expressed in terms of stores and drawers into actions against IoT devices/things (e.g., cash drawers managed by an RP). In some embodiments, the mapping of a store and drawer to a thing name is handled through a static hash map. In some embodiments, the mapping is handled differently based on a particular usage scenario, preference, targeted production capability, or as specified by a user.

In some embodiments, on premises, the gateway (RP) is connected to a device via lower level device protocol (e.g., cash drawer via USB), and runs a Python agent application script in the background. In some embodiments, the script has three main components, guided by three abstract interfaces: cloud, application/agent, and device.

In some embodiments, the cloud component wraps the cloud provider API (e.g., AWSPythonIoTSDK), and provides convenience functions for updating shadow objects and receiving change notifications. In some embodiments, the device component represents individual devices (e.g. drawers), querying for state and commanding to open. Some embodiments use various versions of the device component. For example, one version may use the APG provided USB interface, and another version emulates drawer states using files (virtual for testing purposes). In some embodiments, the application agent component at its core maps events between the device and cloud. In some embodiments, the application agent polls the device component. Some embodiments use asynchronous polling if the device supports this functionality.

Some embodiments use delta notifications from the shadow/twin service adapted to each IoT provider. This simplifies the application agent logic, because the code is only notified when the current and desired states differ. In some embodiments, depending on the business application, change events (e.g., a drawer close event) are delayed in delivery to the cloud, causing the shadow to believe that the device is in a prior state (e.g., drawer is still open), and essentially rendering further requests (e.g., open requests) as no-ops (null operations). Some embodiments register callbacks for both delta and general update events.

Example Management View

Figure 3:
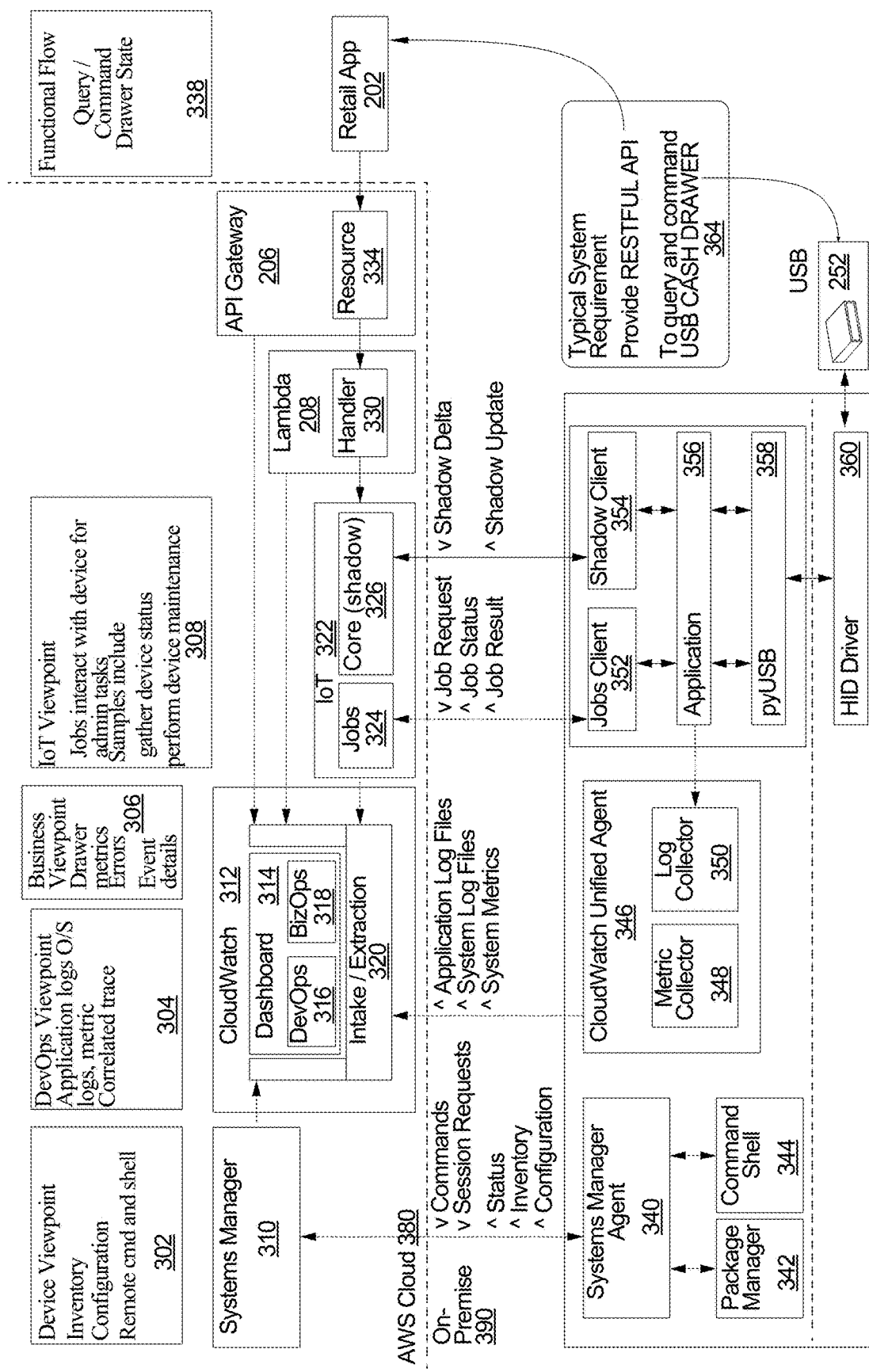
FIG. 3 is a block diagram illustrating an example management view of the framework shown in FIG. 1, according to some embodiments.

FIG. 3 is a block diagram illustrating an example management view of the framework 100, according to some embodiments. In FIG. 3, functional flow is shown by solid lines, and management flow is shown by dotted lines. In the example shown, the functional flow 338 corresponds to a querying or commanding a device (e.g., a drawer) to obtain its state (e.g., the drawer's state). Also, the top portion of the figure corresponds to functionality implemented in AWS cloud 380 (or similar cloud IoT management platform), and the bottom portion (separated by the dashed line from the top portion) corresponds to functionality implemented on-premises 390 (e.g., using a proxy or controller 394, such as Raspberry-Pi) that controls a device 252 (e.g., a USB drawer).

As shown, the management view connects a gateway (e.g., RP) to cloud services which monitor and manage both the application and underlying platform (i.e., O/S and installed packages). In some embodiments, the different viewpoints include:

- a device viewpoint 302 that includes inventory, configuration, and/or remote command and shell commands;
- a DevOps viewpoint 304 that includes application logs, O/S logs, metric, and correlated trace;
- a business viewpoint 306 that includes drawer metrics, errors, and event details; and
- an IoT viewpoint 308 that includes jobs interact with device for administrative tasks. Examples includes gathering device status and performing device maintenance.

Some embodiments pair components and responsibilities as follows:

- Systems Manger 310 handles basic connectivity checks, deployment of O/S package updates, configuration management and compliance checks;
- CloudWatch 312 handles generating logs, collection and shipping of application and system log files, extraction of metrics from selected log records using pattern rules, generating or obtaining CloudWatch Metrics, collection of platform metrics (e.g. CPU, memory, disk), management of metrics generated by log record pattern rules, generating dashboards providing visualization and thresholding; and
- IoT 322 or IoT Jobs 324 handles maintenance and administrative tasks targeted at "things" (devices).

Some embodiments take into account capabilities of cloud providers (e.g., Azure and GCP provide different capabilities than AWS).

In some embodiments, the systems manager 310 accepts status, inventory, and configuration from a systems manager agent 340, and outputs commands and session requests to the systems manager agent 340. In some embodiments, the system manager agent 340 uses a package manager 342 to manage packages, and a command shell module 344 to handle command shells.

In some embodiments, the CloudWatch 312 or similar module includes dashboards 314 (which in turn includes DevOps 316 and BizOps 318, which are configurations). In some embodiments, the CloudWatch 312 or similar module performs intake/extraction (320) by accepting application log files, system log files, system metrics from a CloudWatch unified agent 346 or a similar module. In some embodiments, the CloudWatch Unified Agent 346 includes a metric collector 348 to collect metrics and a log collector 350 to collect logs.

In some embodiments, the IoT 322 module includes a jobs module 324 and a core (shadow) module 326. The Jobs 324 module outputs job requests from a jobs client 352 and accepts job status and job result from the jobs client module 352. The core module 326 accepts shadow updates from a shadow client 354 and outputs shadow delta to the shadow client 354. In some embodiments, the jobs client 352 and the shadow client module 354 are stacked on top of an application module 356 which is in turn stacked on top of a pyUSB module 358 that interfaces with a HID driver 360 to control the USB device 252. The application module 356 outputs logs to the log collector 350. As described above in reference to FIGS. 2A and 2B, a lambda module 208 which includes a handler 330 accepts input from a resource module 334 in the API gateway 206 which in turn accepts (HTTP) requests from the retail application 202, according to some embodiments. As indicated in FIG. 3, some embodiments require (364) that the system provide RESTful API to query and/or command USB cash drawer (or similar device) from the retail or business application 202.

In some embodiments, the application agent component running on the gateway (RP) arbitrates between SDKs for the shadow client and jobs client. In some embodiments, both clients bring requests to the gateway (RP) thereby requiring access to the device interface (e.g., USB). In some embodiments, the two clients are subordinated to a supervisor function which coordinates their access to the interface.

In some embodiments, the above-mentioned AWS cloud services (Systems Manager, CloudWatch, and IoT Jobs) requires installation or integration of agents on the gateway (RP). Some embodiments use Systems Manager and CloudWatch. Some embodiments use IoT Jobs, including for example cataloging device ID's (e.g., cash drawer HID IDs), and for deployment of firmware updates.

In some embodiments, some of the blocks of the cloud 380 and/or the on-premises 390, are configurations. For example, in various embodiments, the intake/extraction module, the IoT jobs module, the core module, the API gateway resource module, the metric collector, the log collector are configurations, allow configuring and/or reconfiguring the framework 100.

Figure 4:

Examples user interfaces are described below in reference to FIGS. 4-8, according to some embodiments. FIG. 4 illustrates an example user interface 400 for displaying a systems manager view in accordance with some embodiments. As illustrated, some embodiments show a pane 402 with pull-down menu(s) for viewing resource groups 404 (e.g., resource groups corresponding to different device groups), insights 406 (e.g., status data, statistics, or analytics regarding managed devices and platforms, etc.), actions 408 (e.g., automation, run command, session manager, patch manager, maintenance windows, state manager, etc.), and shared resources 410 (e.g., a listing of managed instances, activations, documents, and parameter store). In some embodiments, a user can switch between different views by selecting one or more options in the selection pane 402. The example shows managed instances 412 in a region of the user interface. The managed instances view 412 includes an instance identifier 414, name of the instance 416, ping status 418, platform type 420, platform name 422, agent version 424, IP address 426, computer name 428, association status 430, EC2 instance 432, and AWS configuration 434. Although the specific example shows an AWS systems manager view, similar views can be created or customized for other cloud IoT providers, such as Google GCP and Microsoft Azure. For example, instance identifier, name of the instance, ping status, platform type, platform name, agent version, IP address, and computer name are labels that can be used for all cloud IoT providers. Other views may display details of some or all of the labels 414, 416, . . . , 434 shown in FIG. 4, according to some embodiments. In some embodiments, when the IoT platform is concurrently managing devices using multiple cloud services, this user interface optionally lists the one or more cloud services that has currently been configured to manage a particular instance, or the cloud service that was last used to manage a particular instance. As shown in this user interface, in some embodiments, devices having different network capabilities are optionally managed as instances of the same device type, some directly and some with the aid of a proxy device.

Figure 5:
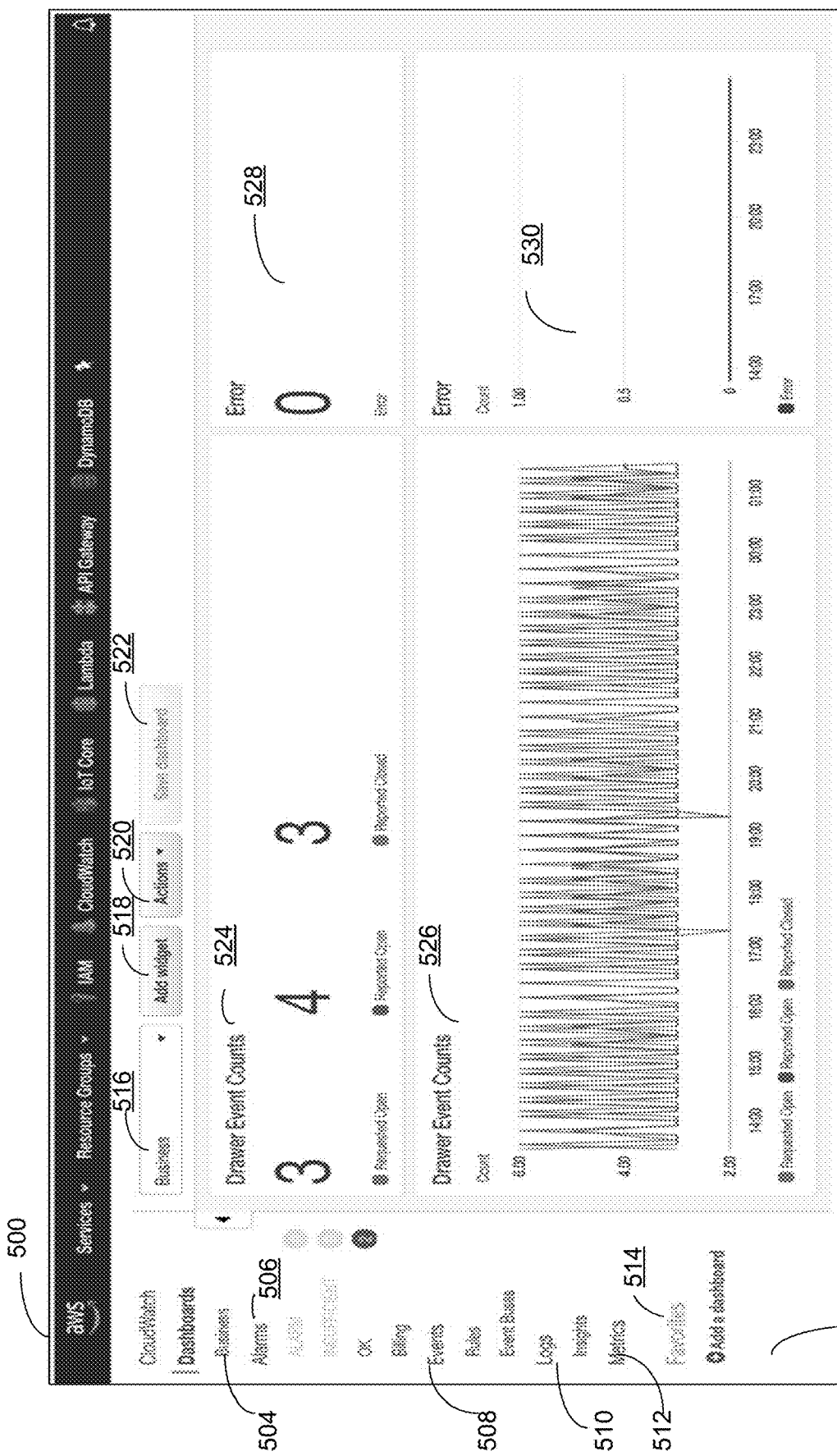

FIG. 5 illustrates an example user interface 500 for displaying a dashboard in accordance with some embodiments. The example uses CloudWatch (described below) but similar views can be created or customized for other cloud IoT providers, according to some embodiments. The example shows a pane 502 with selectable options, according to some embodiments. In this example, the pane 502 shows options for dashboards, to switch between different businesses or business applications 504, alarms 506 (either alarm, insufficient, OK state, billing status), events 508 (either rules or event buses), logs 510 (e.g., insights), metrics 512, and a link to favorites 514. Another region of the interface 500 shows selectable affordances for switching business applications 516, adding widgets 518, switching between actions 520, and saving a dashboard 522. The dashboard also shows drawer event counts 524 (which can show events related to any selected IoT device), including requested open, reported open, and reported closed, and/or a timeline view 526 of the drawer event counts. Another section or region of the dashboard shows errors encountered 528, and a timeline view of the errors encountered 530. Similar to FIG. 4, FIG. 5 is used as an example to demonstrate how the details could be presented for AWS. Similar views can be customized for other cloud IoT providers, according to some embodiments. In some embodiments, when the IoT platform is concurrently managing devices using multiple cloud services, this user interface optionally displays statistics and real-time data of events and logs that aggregate or compare events occurring on multiple cloud services that are used to manage a group of devices.

Figure 6:
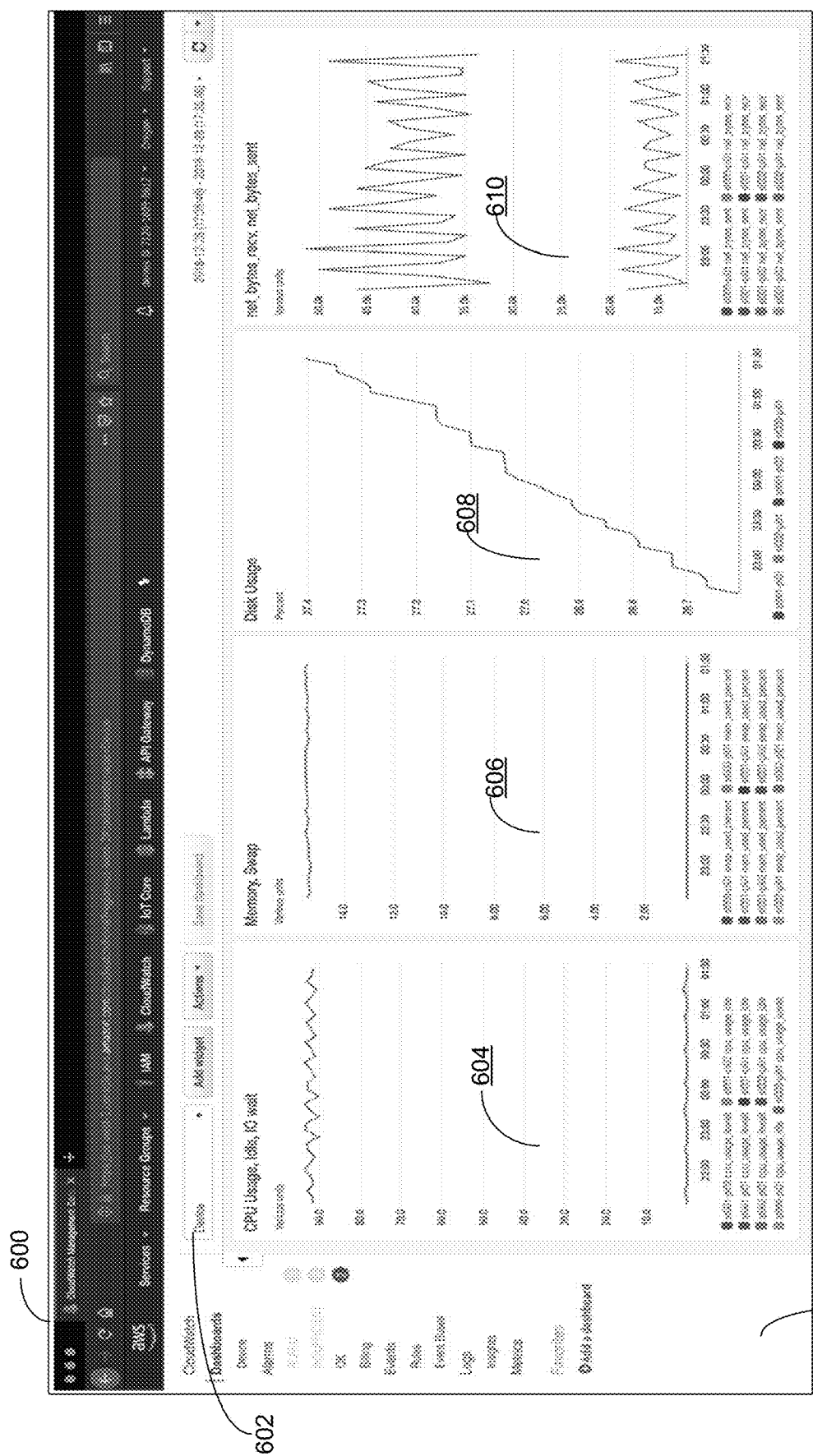

FIG. 6 illustrates an example user interface 600 for displaying a business dashboard in accordance with some embodiments. Similar to FIG. 5, the user interface shows a left pane 502 with selectable options. The user interface shows an option 602 to switch between devices for a business. Different regions 604, 606, 608, and 610 show timeline views of CPU usage, memory or swap information, disk usage, and bytes received or sent, respectively, in accordance with some embodiments. Similar to FIGS. 5 and 6, various similar views can be created and/or customized for different cloud IoT providers and/or devices. In some embodiments, when the IoT platform is concurrently managing devices using multiple cloud services, this user interface optionally displays statistics and real-time data of resource usage across multiple cloud services that are used to manage a selected group of devices.

Figure 7:
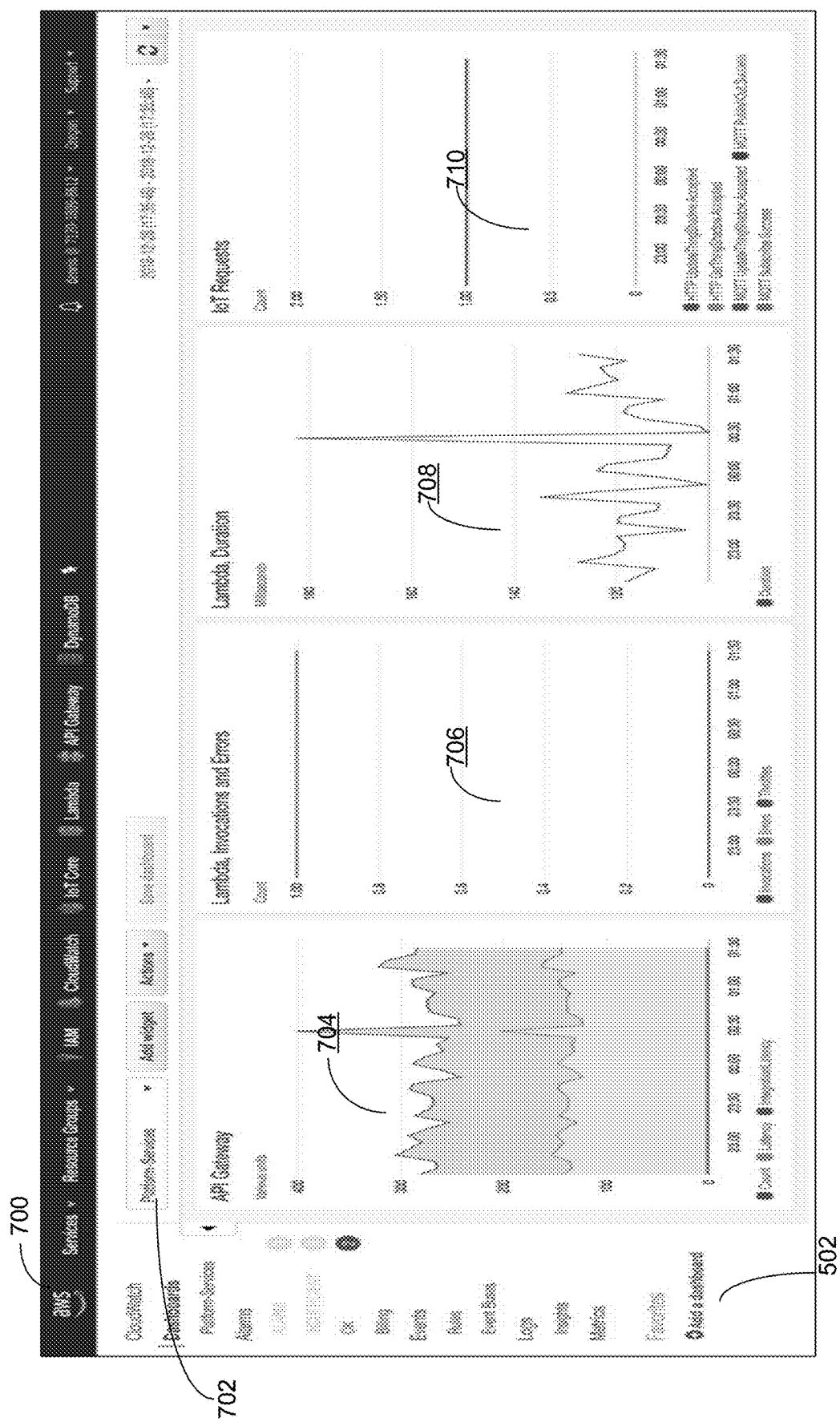

FIG. 7 illustrates an example user interface 700 for displaying a device dashboard in accordance with some embodiments. Similar to FIG. 6, the interface shows a left pane 502 with selectable options. The user interface shows an option 702 to switch between different platform services (sometimes called IoT management platforms). Different regions 704, 706, 708, and 710 show timeline views of API gateway, Lambda, Invocation and errors, Lambda duration, and IoT requests, respectively, in accordance with some embodiments. Similar to FIGS. 4, 5, and 6, various similar views can be created and/or customized for different cloud IoT providers and/or IoT devices. In some embodiments, when the IoT platform is concurrently managing devices using multiple cloud services, this user interface optionally displays statistics and real-time data of corresponding data metrics across multiple cloud services that are used to manage a selected group of devices or service a particular business.

Figure 8:
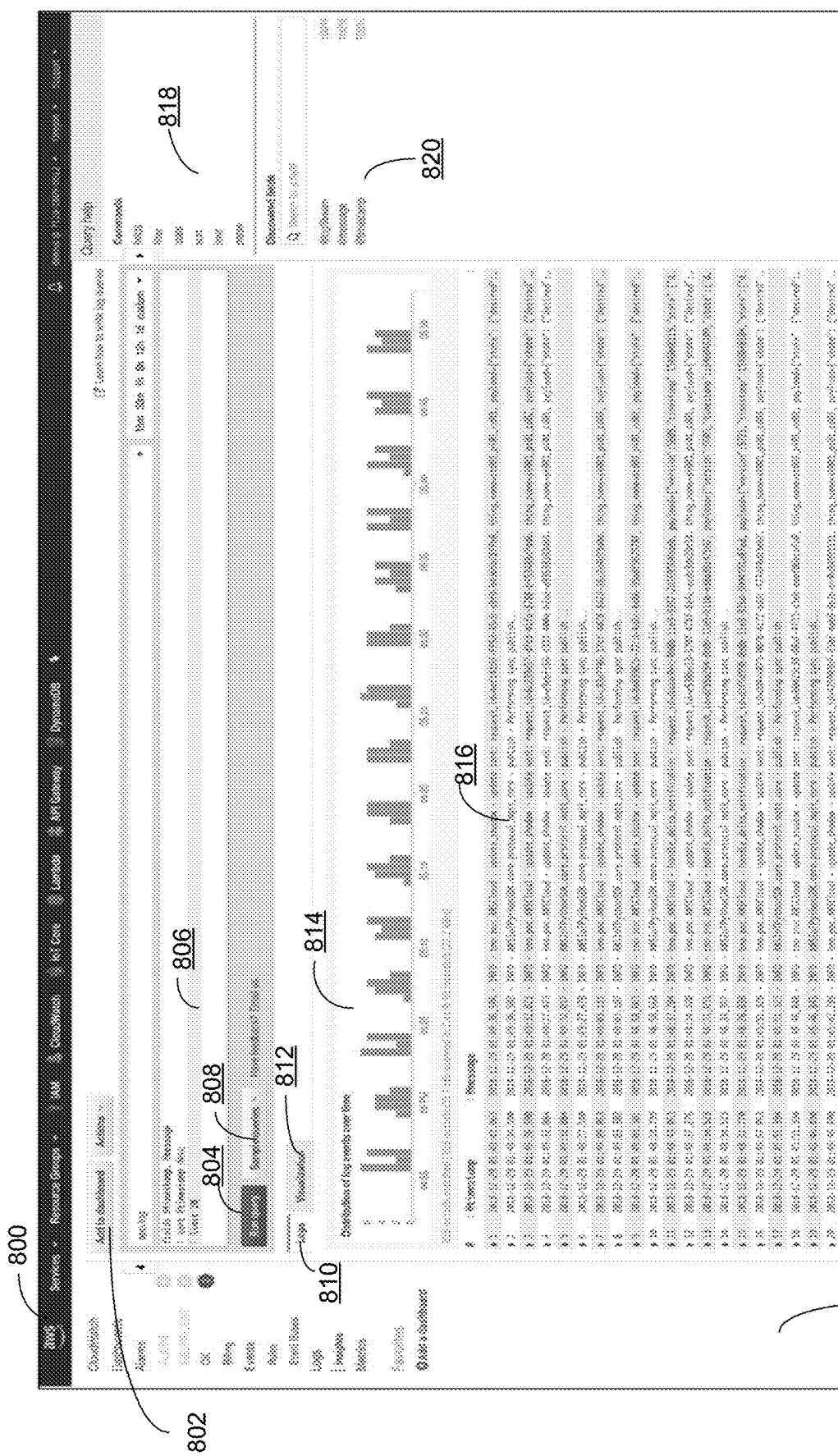

FIG. 8 illustrates an example user interface 800 for displaying insights in accordance with some embodiments. Similar to FIG. 7, the interface shows a left pane 502 with selectable options. The user interface shows an affordance 802 to add the insight to a dashboard, an affordance 804 to run a query, a region 806 (shown above the affordance 804) used as an editor interface, an affordance 808 to show sample queries, a tab 810 for showing logs, and a tab 812 for showing visualizations. As shown, under the logs tab, a timeline view 814 shows log events, and another region 816 shows timestamped messages. Some embodiments show query help commands 818, and/or discovered fields 820 in other regions of the dashboard. Similar to FIGS. 4-7, various similar views can be created and/or customized for different cloud IoT providers and/or IoT devices.

Some embodiments use CloudWatch Unified agent or a similar agent that collects both log records and metrics. In the case of AWS, CloudWatch is the preferred AWS configuration and supersedes the use of separate legacy agents for logs (Python based) and metrics ('collectd' [collection daemon] plug-in). In some embodiments, Systems Manager agent runs on the default 32-bit Raspbian distribution, while the CloudWatch Unified agent does not. In some embodiments, CloudWatch agent uses a 64-bit openSUSE distribution. In some embodiments, both Systems Manager and CloudWatch monitor the RP. Some embodiments use Raspbian as an OS for RP's and fall back to using the AWS Logging agent and collectd with AWS CloudWatch plugin, when required. Some embodiments provide different options based on enterpriser user needs and/or industry standards.

Example Cloud Setup

In some embodiments, applications and agents on the gateway device (e.g., Raspberry Pi or RP) interact with cloud services. This section describes how these components are provisioned for the IoT platform, according to some embodiments. Some embodiments use one or more automated provisioning processes for creating a combination of cloud-based configuration templates (e.g., CloudFormation for AWS, etc.) and/or automation scripts.

Example Backend RESTful API

Some embodiments use AWS API Gateway fronting calls into AWS Lambda (serverless functions) to provide a RESTful API. In some embodiments, a gateway endpoint provides interfacing to the following: a single cash drawer resource, stores/[store-id]/drawers/[drawer-id], and two methods (GET retrieves current drawer state (e.g., closed, opening, open), and POST commands the drawer to open).

In some embodiments, the gateway endpoint is integrated with AWS Lambda, and translates requests into invocations. Some embodiments do not use payload models or transformations. In some embodiments, the definition is exported to a YAML file located in the repository under artifact/cloud/gateway. In some embodiments, this definition is used to recreate the setup under a new account, or as a starting point for another implementation.

Some embodiments use a separate set of RESTful APIs running on Python Flask talking to each of the cloud providers (e.g., AWS, Azure, GCP). Some embodiments the APIs also support serverless targets (e.g., AWS Lambda, Azure Functions, GCP Functions).

Some embodiments use different deployment targets for each of the cloud providers as well as an on-premise option.

Example Serverless Backend

Some embodiments use an AWS Lambda that is a single Python-based handler function invoked from the API gateway. The handler function determines the request type (GET or POST) and makes HTTP calls into the IoT Core Shadow Service. In some embodiments, the code is simplified through use of the AWS boto3 SDK. This presents AWS services as Python types and functions. A function of the handler is to translate store and drawer ids into an IoT thing name. All calls to the Shadow Service require a thing name, which represents a single cash drawer. In some embodiments, this translation uses a static hash map. Some embodiments use different mechanisms to manage configuration data.

As with the API Gateway, some embodiments support error handling. In some embodiments, the system is tuned with respect to start-up time or resource consumption. Some embodiments use dedicated handler functions for each gateway method.

In some embodiments, a current set of definitions is exported to a YAML file located in a repository (e.g., organized under artifact/cloud/lambda). In some embodiments, a stand-alone copy of the Python handler is also stored in this directory.

Example IoT (Things and Principals)

Like many AWS services, AWS IoT includes both a data and control plane. Prior to interacting through the data plane, devices/things (e.g., cash drawers) and principals (RP gateway devices) are provisioned using the control plane. Similar, but provider-specific handling is provided with the other cloud providers (e.g., Azure, GCP).

Some embodiments use a shell script hosted within a Jupyter Notebook that accepts parameters for stores, drawers, and devices, and creates the required assets (including certificate files). The scripts place calls to AWS CLI functions. The notebook contains both code and documentation. Some embodiments support multiple cloud platforms, such as Azure and GCP, with separate Jupyter notebooks, following the same scheme where possible.

In some embodiments, the notebooks are stored in a related repository (e.g., under artifact/cloud/IoT). In some embodiments, things (cash drawers) are allocated first, and then associated with principals (RP) for AWS. For each principal, in some embodiments, certificate and key files are generated which must be presented by the RP when connecting to the IoT message broker.

As with the Gateway and Lambda assets, this mechanism is extensible for other business scenarios and applications. In some embodiments, the system of record for things/devices (e.g., drawers and stores) feed data into a provisioning pipeline, in advance of actually installing a gateway (RP) and devices (cash drawers) in a store.

Example Systems Manager

In some embodiments, each gateway (RP) includes a Systems Manager agent, allowing it to be remotely configured, managed and controlled via AWS.

Some embodiments support remote command execution. In some embodiments, the agent can be activated using a life-limited code and key combination.

In some embodiments, prior to setting up an RP, a user needs to use the console to be sure there is an open activation. In some embodiments, the key and code values found via the use of the console is used to set up the device agent. Some embodiments automate this process.

Example Dashboards

Some embodiments use CloudWatch that accepts logs and metrics from RP devices. Metrics are stored and then presented on dashboards. Logs records can be queried using CloudWatch Insights. Additionally, business level metrics (e.g. drawer open requests) are extracted from application log records and made available for dashboards and alerts.

Some embodiments provide one or more dashboards. For example, some embodiments provide multiple dashboards (e.g., using CloudWatch) to provide operational visibility. Some embodiments show dashboards corresponding to business, count of drawer open requests and observed changes (open, close), and separate count for errors (e.g. USB disconnect), device, performance metrics, such as CPU, memory, disk, and network, platform services, and/or event counts from API Gateway and Lambda services. Some embodiments show status (e.g., success, failure).

In some embodiments, exported definitions for the dashboards and metric filters are stored in a repository (e.g., under artifact/cloud/cloudwatch).

Example Device Setup

An example installation process includes steps for setting up Base Operating System (O/S), O/S Level Packages, Python Packages, AWS Systems Manager Agent, AWS CloudWatch Unified Agent or AWS CloudWatch Logs Agent and collectd with AWS CloudWatch Plugin, Application Files, and Application Launch and Verification. Some embodiments use an automated imaging process based on these installation steps. Some embodiments extend the installation steps for different devices, and/or for different IoT management platforms. In the example process, a base OS is installed on a proxy device. For example, a default Raspbian lite distribution, OpenSUSE, LEAP 15, or JeOS, is installed on a Raspberry Pi. Agents are installed and configured over the base OS to implement the functions of setting up, creating platform specific user credentials, creating user with policy permissions, creating CloudWatch agent server policies, setting up access credentials and permissions for one or more cloud platforms, adding metrics to be collected from the device (e.g., memory used, swap space used, cpu used, bytes transferred, etc.), setting up and configuring collectd agents for collecting logs and status, setting up and configuring cloud-specific CloudWatch agents for collecting events, metrics, status, and logs, etc.

Example Web Portal

This section describes an example web-based portal frontend and backend for managing devices across three cloud providers (e.g., AWS, Azure, GCP), according to some embodiments. Some embodiments display a list of devices consolidated across cloud providers and allow a user to click on an individual device to update, view the device state, and/or synchronize the device across the cloud providers. Some embodiments display a list of available devices deployed on each of the cloud providers in a single list as shown below.

Figure 9:
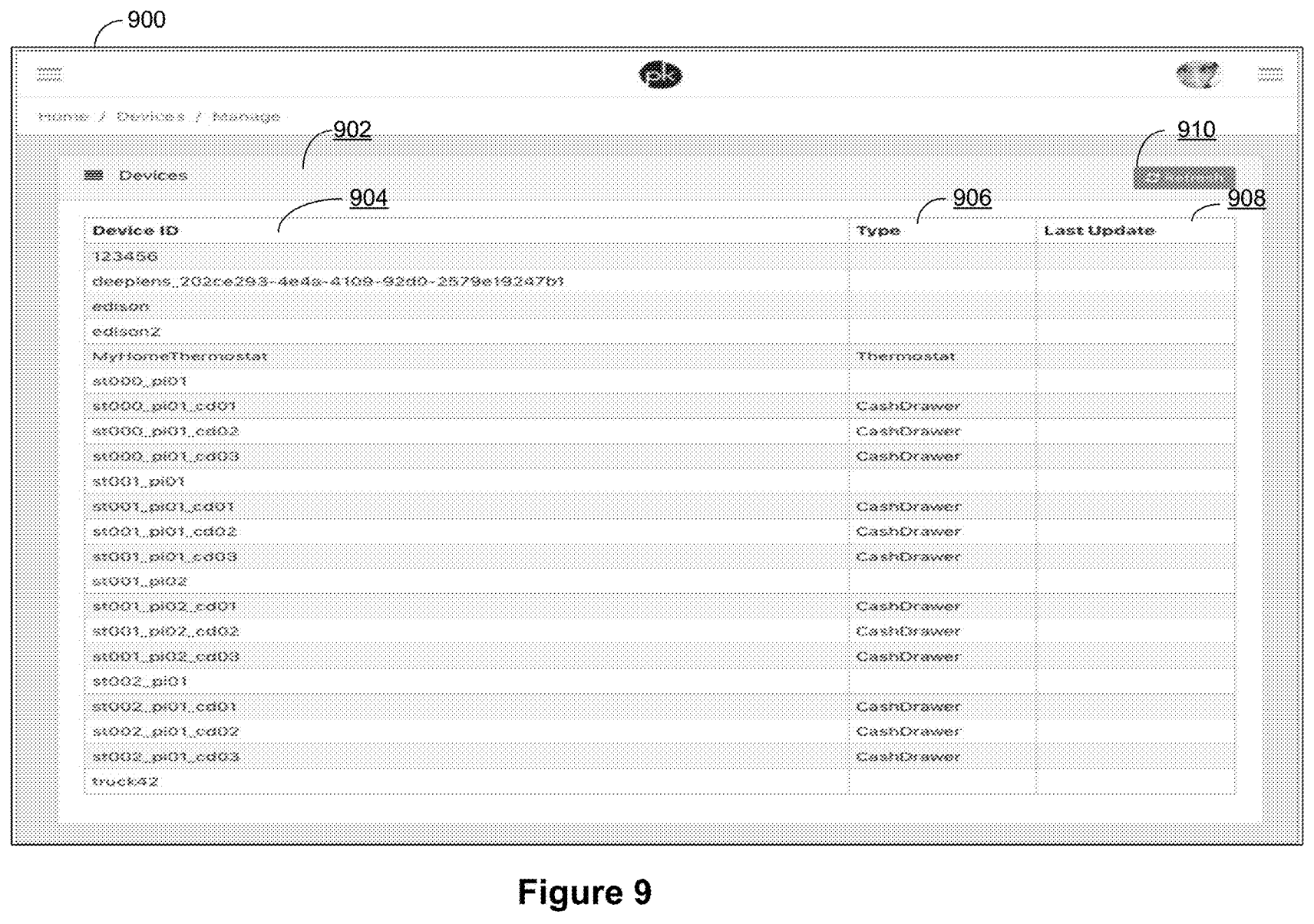

FIG. 9 illustrates an example user interface 900 for displaying devices in accordance with some embodiments. As shown, a view or table 902 includes a column 904 for displaying device identifiers, a column 906 for displaying types (of the devices), and another column 908 showing last updates to the devices. Some embodiments provide an affordance 910 to refresh the view based on obtaining updated information for the devices. The views are customizable for different IoT devices, and for different usage scenarios, according to some embodiments.

Figure 10A:
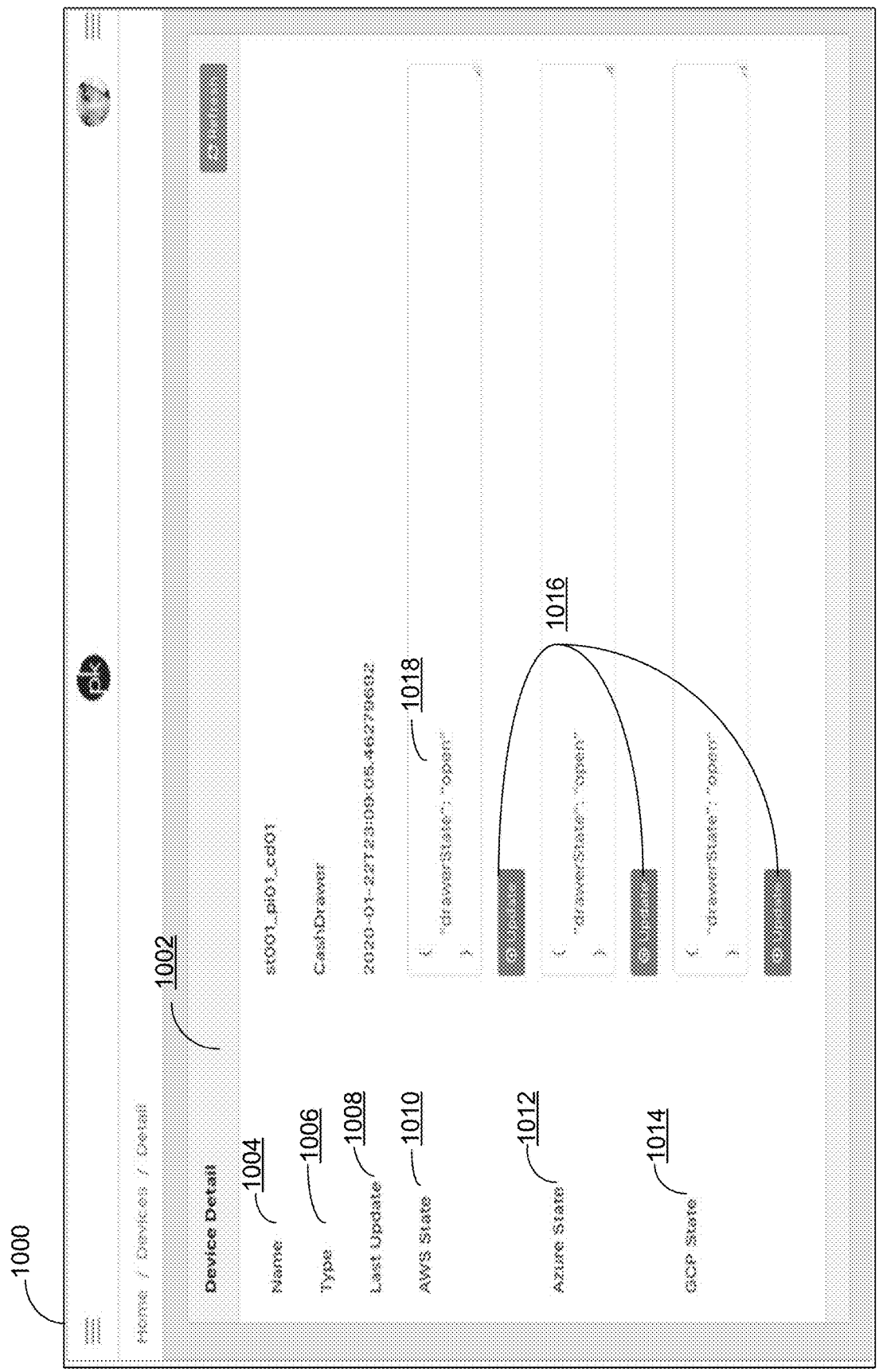

In some embodiments, a user can click on an individual device to see device details. FIG. 10A illustrates an example user interface 1000 for displaying devices in accordance with some embodiments. As shown, a detail view 1002 includes name 1004, type, 1006, last update 1008, AWS state 1010, Azure state 1012, and GCP state 1014, according to some embodiments. In some embodiments, via the detail view shown in FIG. 10A, a user can update 1016 the device state on each cloud provider (or any one of the cloud provider), and view that the device has been synchronized across the cloud providers. Although FIG. 10A shows a programmatic way of updating the status 1018 (i.e., a user modifies a script or updates a parameter), customizable buttons, affordances, or options may be provided, in various embodiments.

Figure 10B:
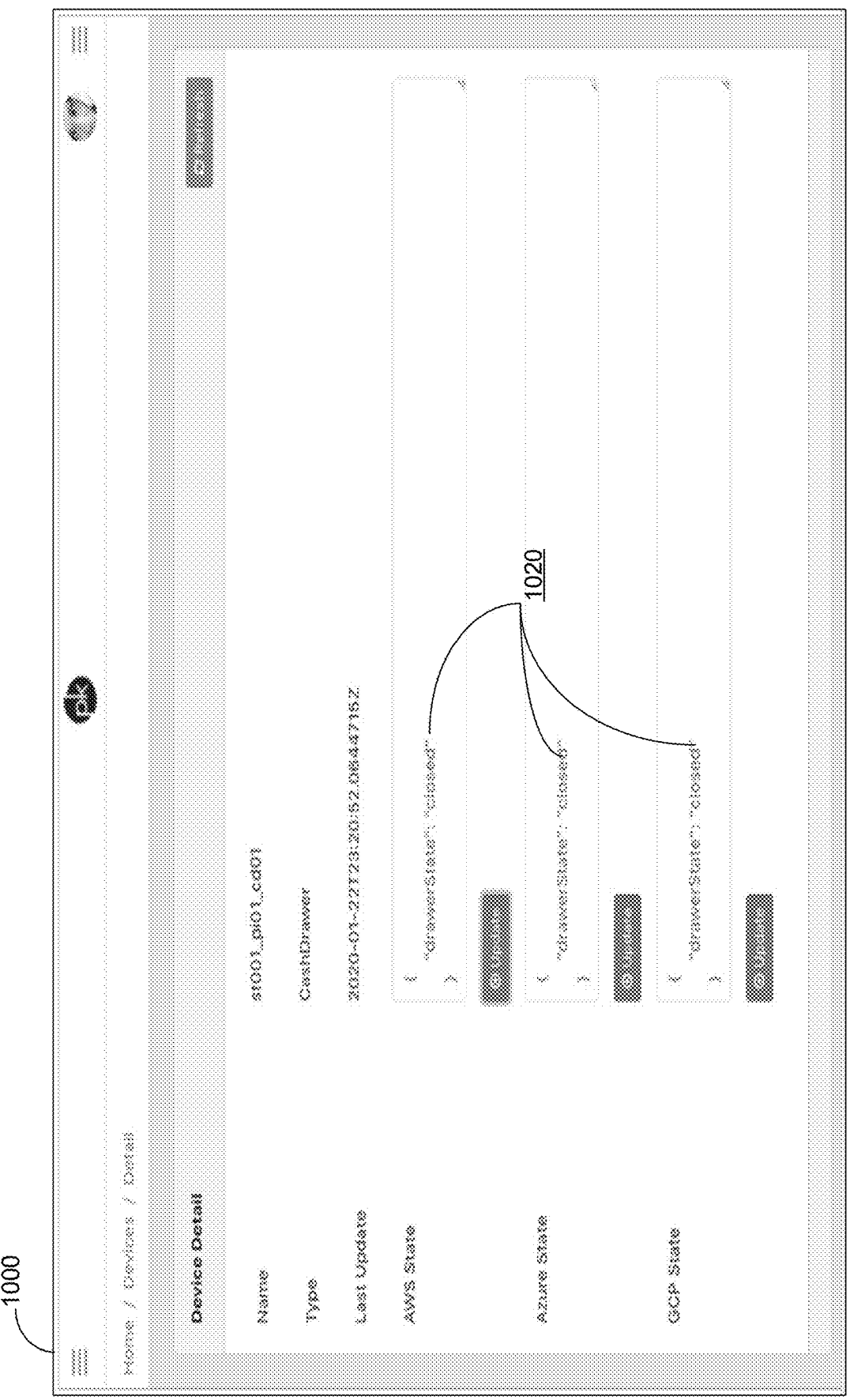

FIG. 10B illustrates the updated example user interface 1000 in accordance with some embodiments. In this example, the user has changed state from "open" to "closed" via AWS and can then view updated state 1020. In some embodiments, a backend device agent collects or gathers the notification about the change and applies the same change to both Azure and GCP (even though the user only changed the state for AWS).

Example Process for Monitoring and Managing IoT Devices

FIGS. 11A-11L are a flowchart 1100 of a method 1102 for monitoring and managing IoT devices using a cloud- and device-agnostic platform, in accordance with some embodiments. The method is performed (1104) at an electronic device (e.g., a server or a host computer) having one or more processors and memory storing one or more programs configured for execution by the one or more processors.

The method includes providing (1106) a cloud- and device-agnostic (i.e., multi-cloud capable) IoT cloud platform that interfaces with a plurality of applications (e.g., different business applications, each providing user interfaces and/or instructions for sending requests for performing various transactions corresponding to IoT devices to the cloud- and device-agnostic IoT platform), a plurality of IoT management platforms (e.g., respective platforms provided by various cloud service providers), and a plurality of IoT device controllers (e.g., controllers installed on smart IoT devices and/or controllers installed on proxy devices of dumb IoT devices). Each IoT management platform manages one or more IoT device controllers (e.g., having established communication pathways with the IoT device controllers or the necessary credentials and instructions to establish such communication pathways), and each IoT device controller controls a respective IoT device (e.g., having instructions to generate device-specific instructions to control the respective IoT devices in accordance with transaction requests and/or operation commands). The method includes receiving (1108) a first request for performing a first transaction corresponding to a first IoT device (e.g., a one-shot transaction that involves a single request that causes a change or action at the target IoT device and utilizes a pathway through a cloud platform only a single time (e.g., a ping to see which device is online, a request to turn on a device, etc.), a round-trip transaction that involves a single request and a single response to be transmitted using a pathway through a cloud platform twice (e.g., a request to check a temperature of a device, a request to take a picture using a device and retrieve the picture, etc.), or a sustained transaction that requires repeated actions taking place over a period of time that involve utilizing a pathway through a cloud platform multiple times (e.g., monitoring a status over a period of time, collecting log data, etc.), etc.) from a first application (e.g., an Point-of-Sale application, a smart home control application, etc.). In response to receiving the first request, the method includes generating (1110) a first set of operation commands for performing the first transaction through a first IoT management platform to manage a first IoT device controller that controls the first IoT device. The first set of operation commands is generated based on a first set of configurations associating the first transaction to the first IoT management platform. For example, the first set of operation commands includes commands that are used to establish a platform-specific pathway to access and control the respective IoT device controller through the first IoT management platform and to cause the IoT device controller to generate the device-specific commands to accomplish at least some of the goals of the first transaction. The method also includes triggering (1112) performance of the first transaction by issuing the first set of operation commands to the first IoT management platform through an interface between the IoT cloud platform and the first IoT management platform. For example, the interface between the IoT cloud platform and the first IoT management platform include preconfigured settings or APIs that allow transmission of operation commands and responses between the cloud- and device-agnostic IoT cloud platform and the first IoT platform.

Figure 11A:
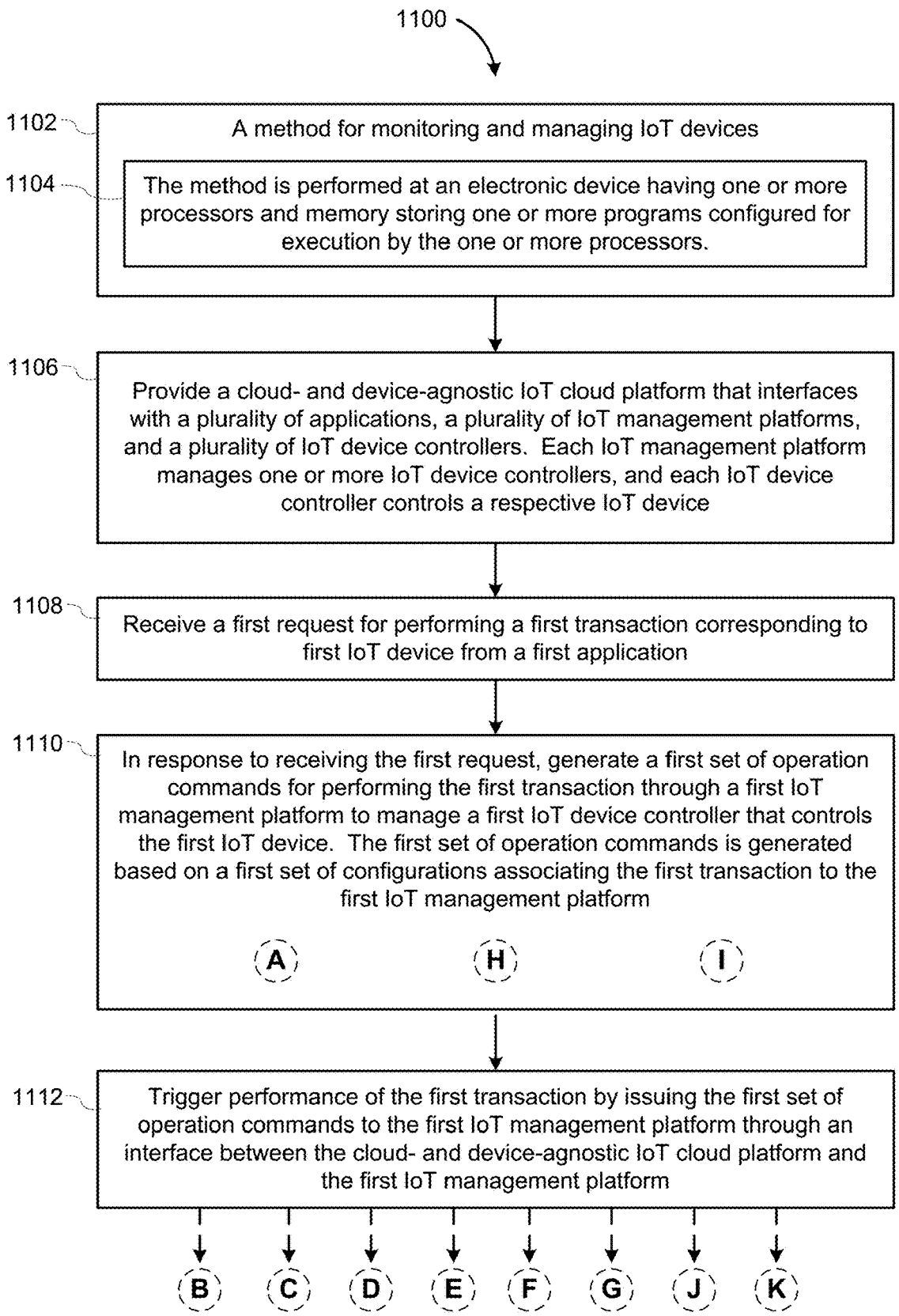
FIG. 11A-11L are a flowchart of a method for monitoring and managing IoT devices, in accordance with some embodiments.
Figure 11B:
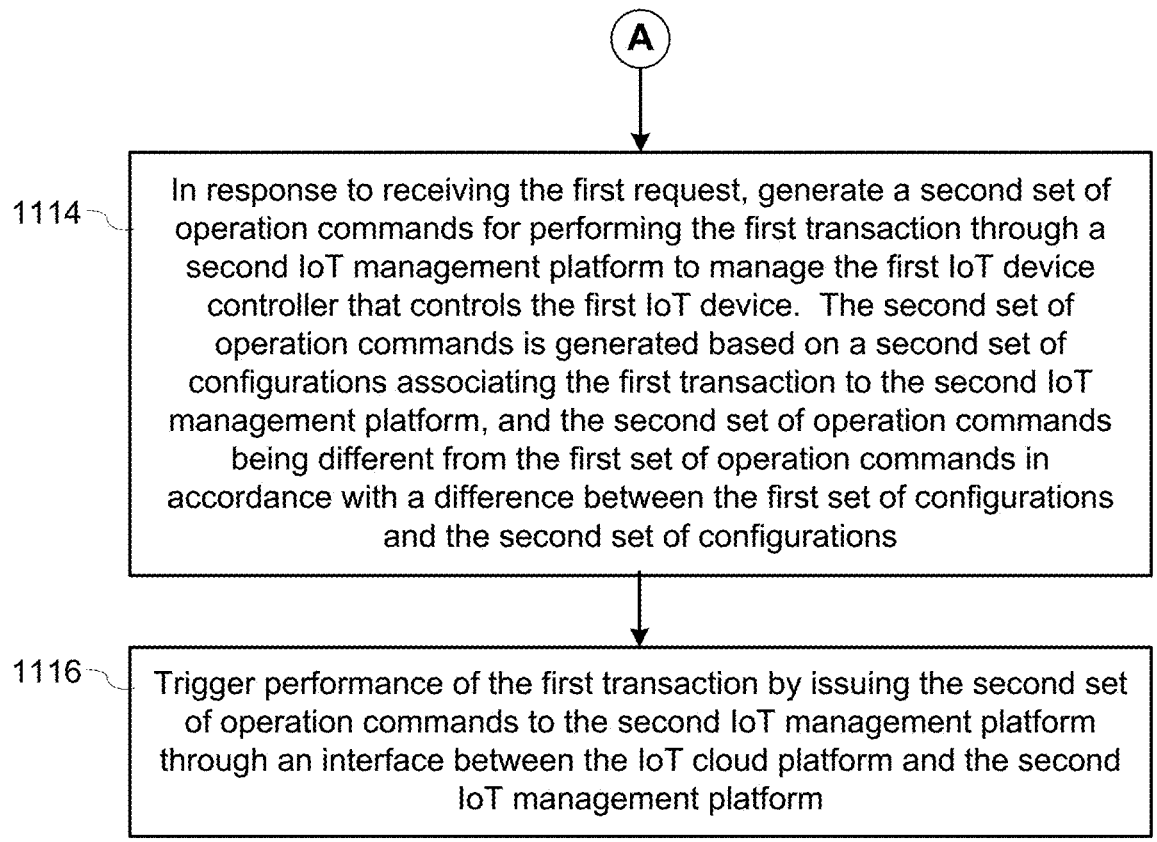

Referring next to FIG. 11B, in some embodiments, the method further includes, in response to receiving the first request, generating (1114) a second set of operation commands for performing the first transaction through a second IoT management platform, different from the first IoT management platform, to manage the first IoT device controller that controls the first IoT device. The second set of operation commands is generated based on a second set of configurations associating the first transaction to the second IoT management platform, the second set of operation commands being different from the first set of operation commands in accordance with a difference between the first set of configurations and the second set of configurations. For example, different sets of operation commands are generated to establish respective pathways to accomplish the same transaction on different IoT management platforms. The differences are optionally specified in accordance with the different configuration files established for the two IoT management platforms. The method also includes triggering (1116) performance of the first transaction by issuing the second set of operation commands to the second IoT management platform through an interface between the cloud- and device-agnostic IoT cloud platform and the second IoT management platform.

In some embodiments, triggering performance of the first transaction by issuing the first set of operation commands and triggering performance of the first transaction by issuing the second set of operation commands are respectively performed in response to two separate run-time requests for performing the first transaction. For example, when the transaction is a one-shot transaction that only needs to invoke the pathway of an IoT management platform once, a first run-time request for performing the transaction is received (e.g., from the business application) first, and the first transaction is performed utilizing a pathway established over the first IoT management platform; and later on, a second run-time request is received (e.g., from the business application), and the first transaction is performed utilizing a pathway established over the second IoT management platform. In some embodiments, the pathways over these two IoT management platforms are optionally established prior to receiving either of the run-time requests, e.g., during a setup phase of the business application on the cloud- and device-agnostic IoT cloud platform. In some embodiments, the pathways over these two IoT management platforms are optionally established prior to receiving either of the run-time requests, e.g., during a setup phase of the business application on the cloud- and device-agnostic IoT cloud platform. This is applicable to a scenario where the business application can establish the option to use multiple IoT management platforms for a transaction prior to issuing a run-time request for performing the transaction. Additionally, the framework 100 can determine, based on setup or configuration files, without receiving a runtime request from the business application, that multiple IoT management platforms can be used for performing the transaction.

In some embodiments, triggering performance of the first transaction by issuing the first set of operation commands and triggering performance of the first transaction by issuing the second set of operation commands are respectively performed in response to a single run-time request for performing the first transaction. For example, when the transaction is a transaction that needs to repeat an action and invoke the pathway of an IoT management multiple times for each repeated action over a period of time, a first run-time request for performing the transaction is received (e.g., from the business application), and one or more of the repeated actions of the first transaction are performed utilizing a pathway established over the first IoT management platform; and later on, one or more repeated actions of the first transaction is performed utilizing a pathway established over the second IoT management platform. In some embodiments, the pathways over these two IoT management platforms are optionally established prior to receiving the run-time request, e.g., during a setup phase of the business application on the cloud- and device-agnostic IoT cloud platform. In some embodiments, the pathways over these two IoT management platforms are optionally established in response to a run-time request that specifies one or both of the first and the second IoT management platforms. This is applicable to a scenario where the business application can establish the option to use multiple IoT management platforms for a transaction by issuing a run-time request for performing the transaction, with an option to allow the cloud platform to choose one or more IoT management platforms to use for the transaction.

In some embodiments, generating the first set of operation commands and generating the second set of operation commands are respectively performed in response to a single configuration request for setting up the first transaction on the cloud- and device-agnostic IoT cloud platform. In some embodiments, the first and second IoT management platforms are selected by a user or specified in a configuration file of the business application. In some embodiments, generating the first set of operation commands and generating the second set of operation commands are respectively performed in response to a single run-time request for performing the first transaction. In some embodiments, the first and second IoT management platforms are selected by a user in a user interface provided by the cloud- and device-agnostic IoT cloud platform, or automatically selected by the IoT cloud platform based on preset conditions related to the type of transaction, type of IoT device, capacities of the IoT management platforms, and the performance metrics associated with the IoT management platforms with respect to the type of transaction, type of IoT device, etc.

Figure 11C:
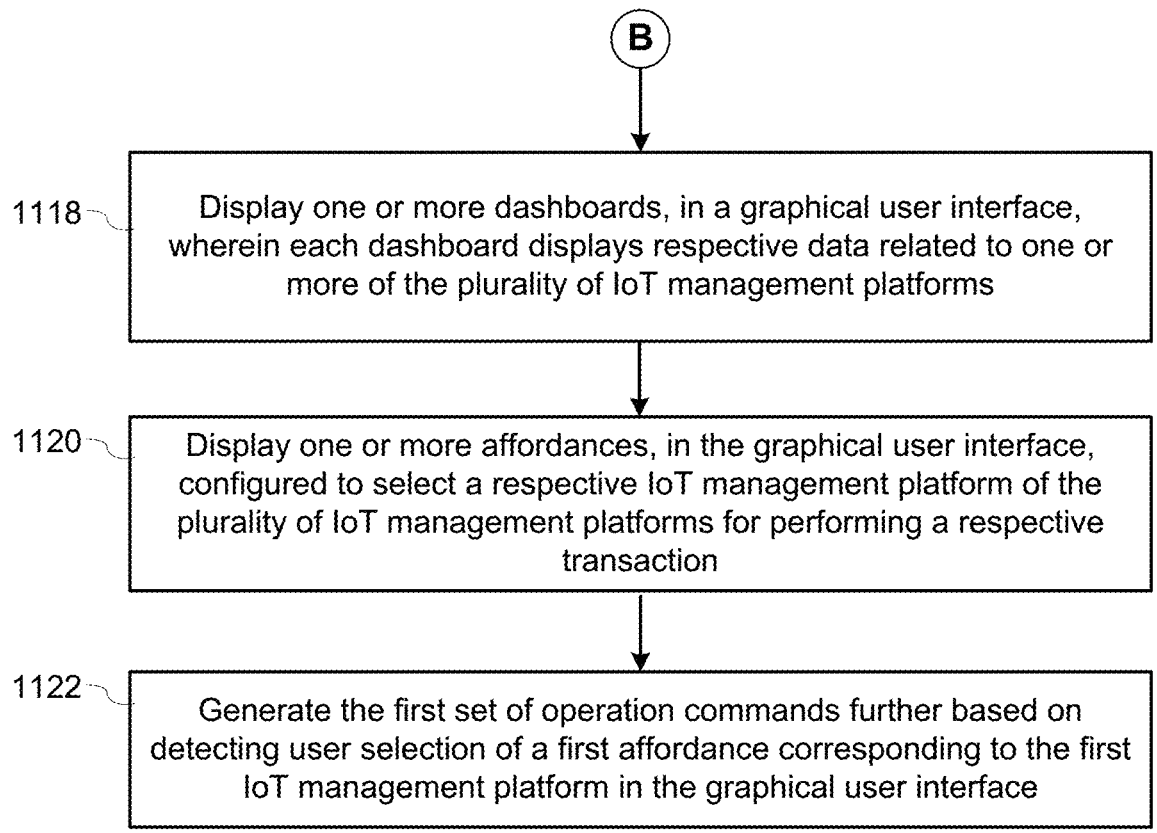

Referring next to FIG. 11C, in some embodiments, the method further includes displaying (1118) one or more dashboards, in a graphical user interface. Each dashboard displays respective data related to one or more of the plurality of IoT management platforms. The method also includes displaying (1120) one or more affordances, in the graphical user interface, configured to select a respective IoT management platform of the plurality of IoT management platforms for performing a respective transaction. The first set of operation commands is generated (1122) further based on detecting user selection of a first affordance corresponding to the first IoT management platform in the graphical user interface.

Figure 11D:
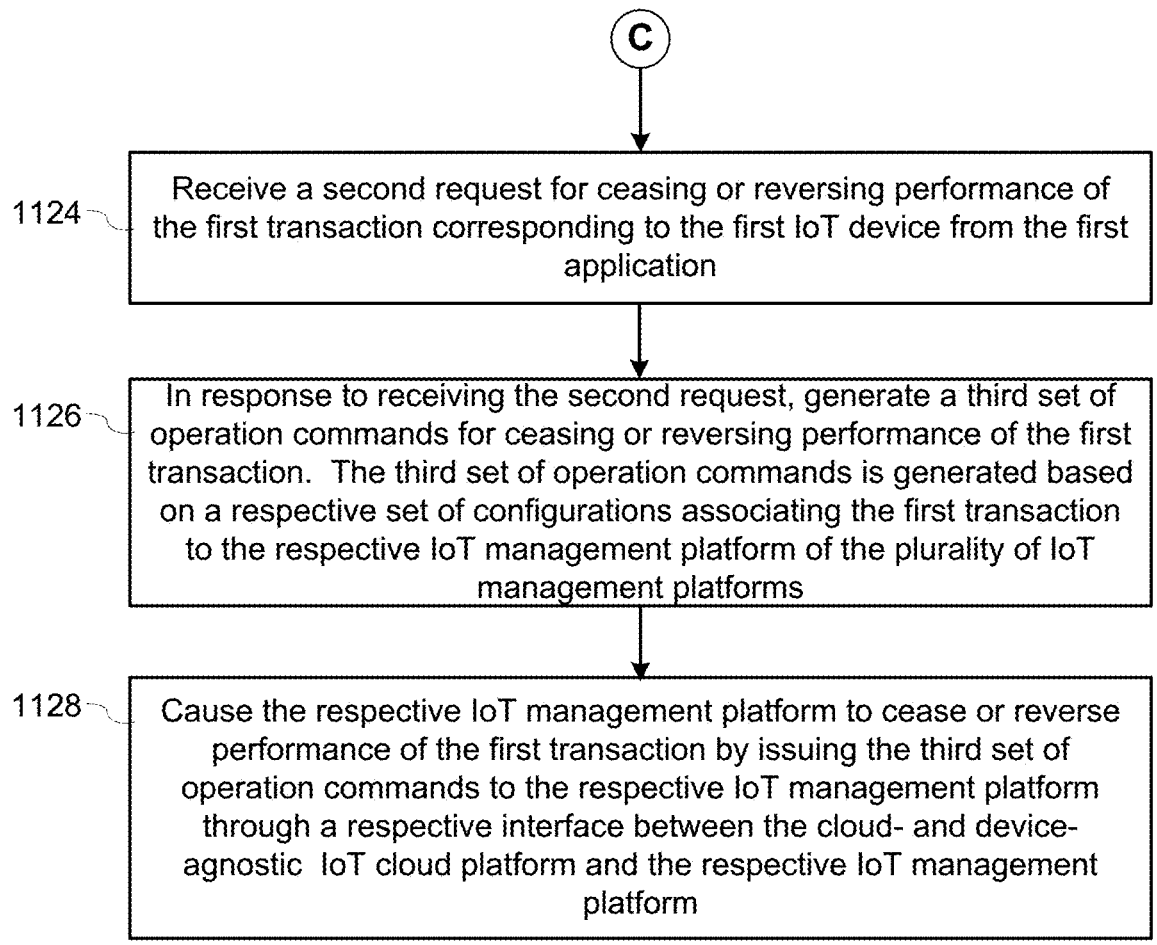

Referring next to FIG. 11D, in some embodiments, the method further includes receiving (1124) a second request for ceasing or reversing performance of the first transaction corresponding to the first IoT device from the first application. The method also includes, in response to receiving the second request, generating (1126) a third set of operation commands for ceasing or reversing performance of the first transaction, wherein the third set of operation commands is generated based on a respective set of configurations associating the first transaction to the respective IoT management platform of the plurality of IoT management platforms. The method also includes causing (1128) the respective IoT management platform to cease or reverse performance of the first transaction by issuing the third set of operation commands to the respective IoT management platform through a respective interface between the cloud- and device-agnostic IoT cloud platform and the respective IoT management platform. In some embodiments, the second request is for ceasing performance of the first transaction (e.g., ceasing performance of a transaction that require repeated actions to be performed over a period of time and utilizing the pathway established over an IoT management platform for each repeated action, such as a status monitoring transaction that checks a state of a device every 10 seconds), and the respective IoT management platform is the first IoT management platform through which the first set of operation commands were issued to trigger performance of the first transaction. To cease performance of a transaction that require repeated actions, the pathway established for the performance of the transaction needs to be decommissioned with its resources released, and the operation commands used to cease performance of the transaction are generated in accordance with the same set of configurations associating the first transaction with the IoT management platform that provides the pathway. Once these operation commands are issued to the IoT management platform, the pathway will be decommissioned, its resources will be released, and the performance of the transaction will cease. In some embodiments, the second request is for reversing performance of the first transaction (e.g., turning a device OFF reverses the first transaction that turned the device ON; or CLOSING a cash register reverses the first transaction that OPENed the cash register), and the respective IoT management platform is a second IoT management platform that is distinct from the first IoT management platform through which the first set of operation commands were issued to trigger performance of the first transaction. For example, the first transaction is performed using a pathway established over a first IoT management platform, another transaction is optionally performed using a pathway established over the same first IoT management platform, or using a pathway established over a different, second IoT management platform. When the cloud- and device-agnostic IoT cloud platform is used, there is no restriction that a transaction that reverses the effect of a previous transaction be performed through the same or different IoT management platforms. The IoT management platform can be selected based on user preference or based on other factors and considerations described herein.

Figure 11E:
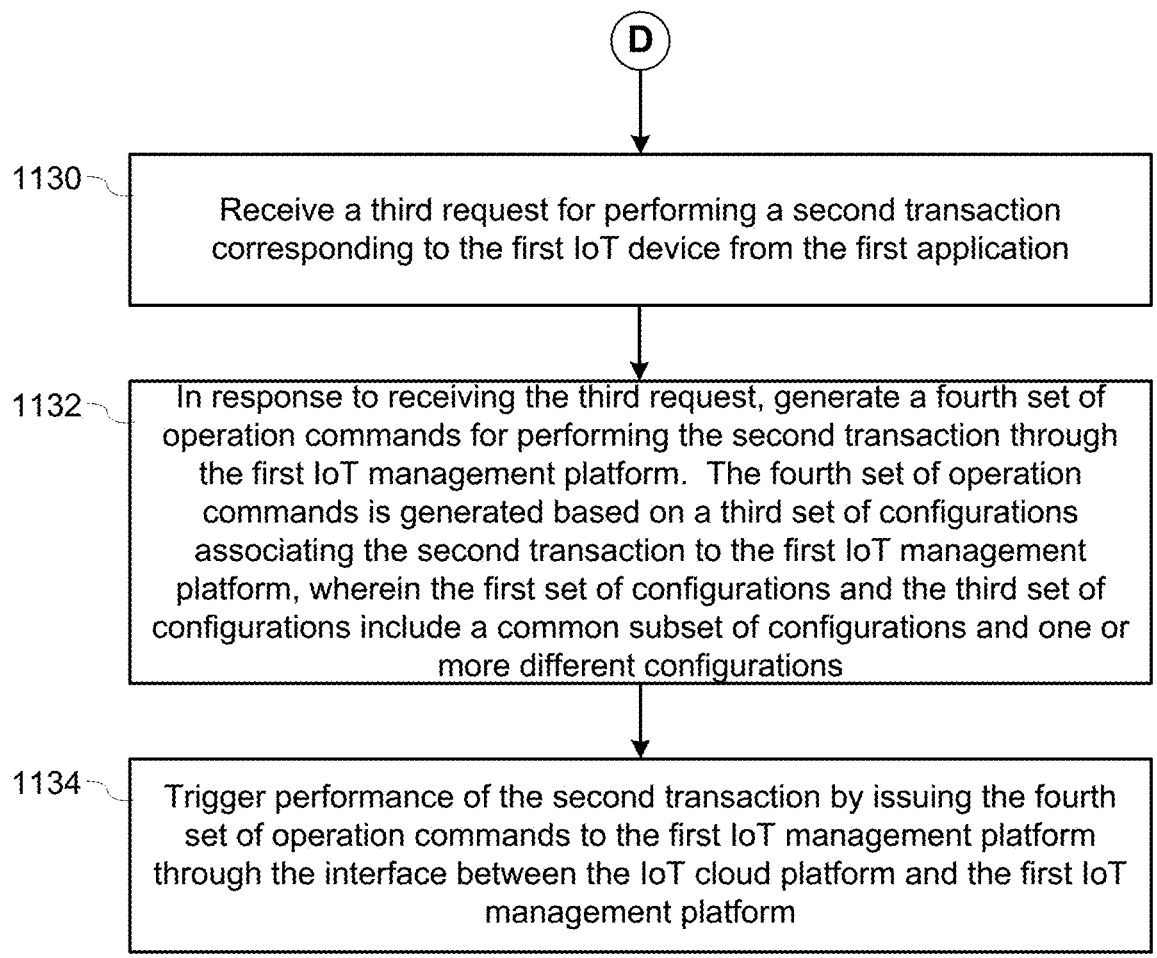

Referring next to FIG. 11E, in some embodiments, the method further includes receiving (1130) a third request for performing a second transaction, distinct from the first transaction, corresponding to the first IoT device from the first application. The method includes, in response to receiving the third request, generating (1132) a fourth set of operation commands for performing the second transaction through the first IoT management platform. The fourth set of operation commands is generated based on a third set of configurations associating the second transaction to the first IoT management platform. The first set of configurations and the third set of configurations include a common subset of configurations and one or more different configurations. The method also includes triggering (1134) performance of the second transaction by issuing the fourth set of operation commands to the first IoT management platform through the interface between the cloud- and device agnostic IoT cloud platform and the first IoT management platform. For example, the first set of configurations and the third set of configurations both follow conventions of an abstraction layer that describes the plurality of IoT management platforms using (i) a set of common attributes or parameters corresponding to aspects that are common to the plurality of IoT management platforms and (ii) a set of pluggable attributes or parameters corresponding to aspects that are unique to each IoT management platform.

Figure 11F:
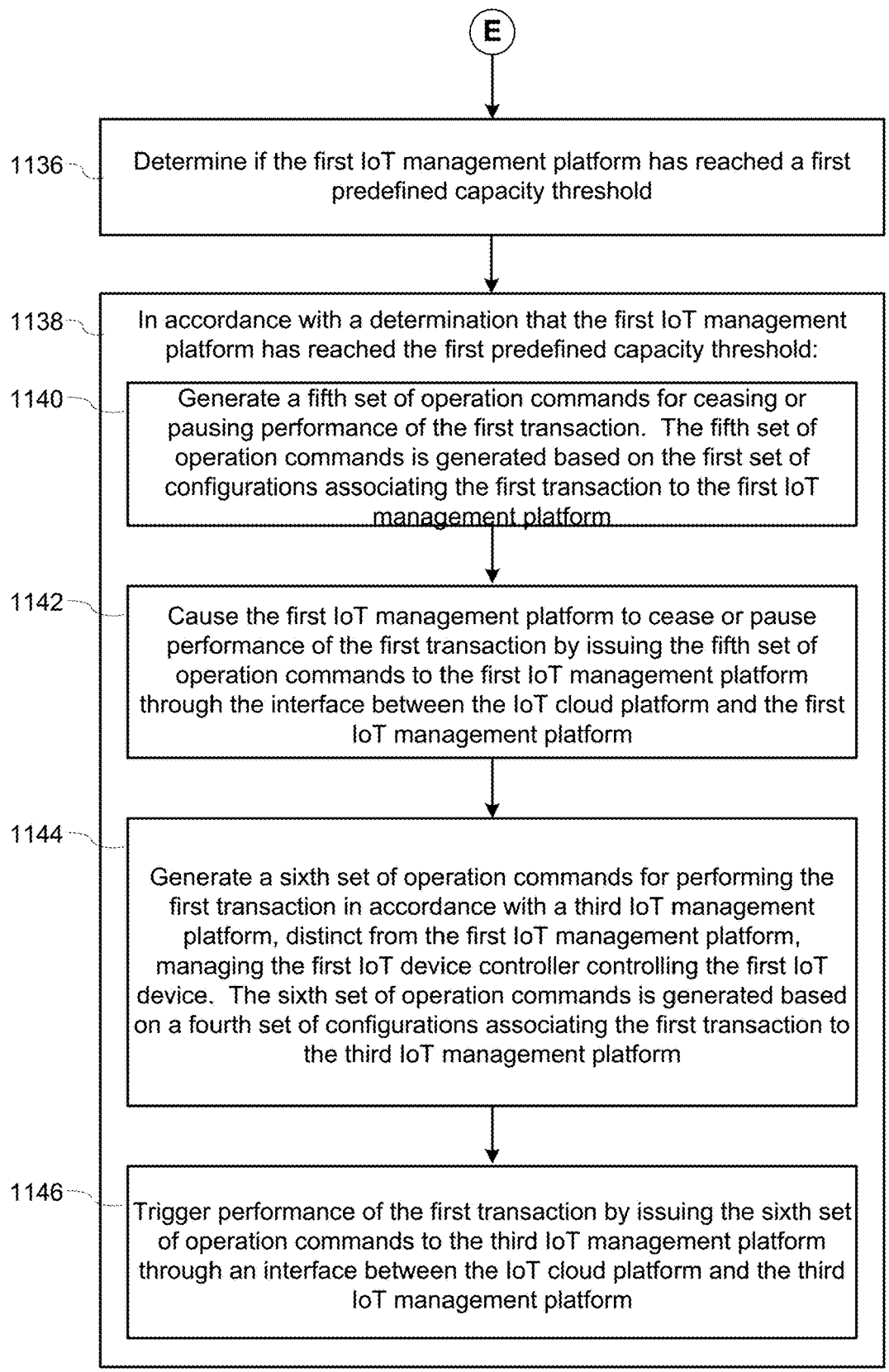

Referring next to FIG. 11F, in some embodiments, the first transaction includes repeated actions occurring over a respective IoT management platform during a period of time, and the method further includes detecting (1136) if the first IoT management platform has reached a first predefined capacity threshold. In accordance with a determination that (1138) that the first IoT management platform has reached the first predefined capacity threshold, the method includes generating (1140) a fifth set of operation commands for ceasing or pausing performance of the first transaction. The fifth set of operation commands is generated based on the first set of configurations associating the first transaction to the first IoT management platform. The method also includes causing (1142) the first IoT management platform to cease or pause performance of the first transaction by issuing the fifth set of operation commands to the first IoT management platform through the interface between the cloud- and device-agnostic IoT cloud platform and the first IoT management platform. The method also includes (e.g., during a set up stage, or during run-time of the first transaction) generating (1144) a sixth set of operation commands for performing the first transaction in accordance with a third IoT management platform, distinct from the first IoT management platform, managing the first IoT device controller controlling the first IoT device. The sixth set of operation commands is generated based on a fourth set of configurations associating the first transaction to the third IoT management platform. The method also includes triggering (1146) performance of the first transaction by issuing the sixth set of operation commands to the third IoT management platform through an interface between the IoT cloud platform and the third IoT management platform. In some embodiments, the third IoT management platform optionally has a higher predefined capacity threshold than the first predefined capacity threshold, and the performance of the first transaction ceases on the first IoT management platform. In some embodiments, some of the load on the first IoT management platform is shifted to the third IoT management platform, and the first IoT management platform and the third IoT management platform both perform the first transaction, e.g., in a coordinated manner.

Figure 11G:
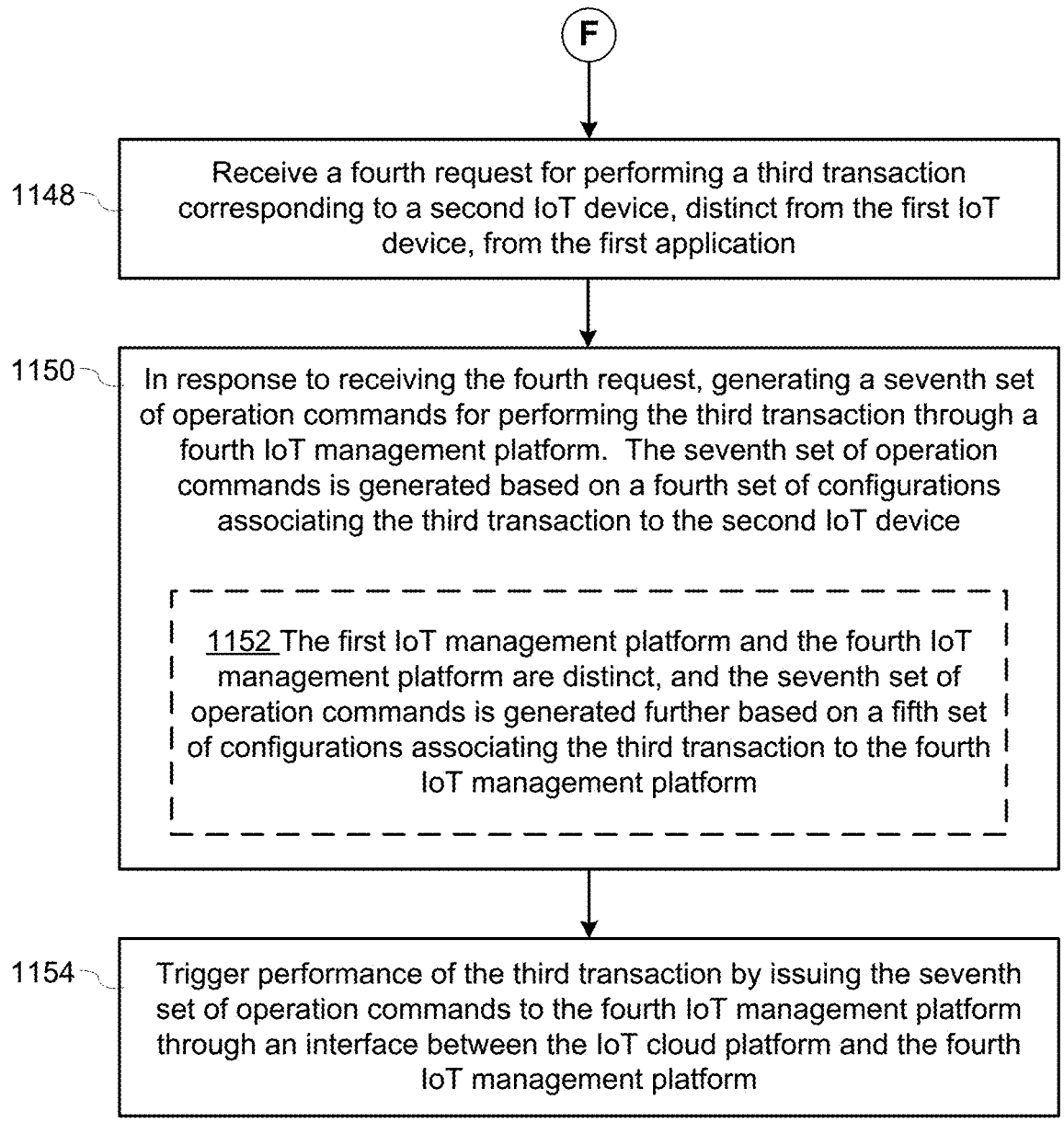

Referring next to FIG. 11G, in some embodiments, the method further includes receiving (1148) a fourth request for performing a third transaction corresponding to a second IoT device, distinct from the first IoT device (e.g., completely unrelated and independent devices of different device types, or devices that share some common characteristics, such as device type, device group, etc., but optionally, also have some differences (e.g., communication capabilities, or native command set, etc.)), from the first application. In response to receiving the fourth request, the method also includes generating (1150) a seventh set of operation commands for performing the third transaction through a fourth IoT management platform. The seventh set of operation commands is generated based on a fourth set of configurations associating the third transaction to the second IoT device (e.g., configurations that bridge the cloud-specific operation commands and the native device commands of the second IoT device for the third transaction). In some embodiments, the first IoT management platform and the fourth IoT management platform are distinct, and the seventh set of operation commands is generated (1152) further based on a fifth set of configurations associating the third transaction to the fourth IoT management platform. The method also includes triggering (1154) performance of the third transaction by issuing the seventh set of operation commands to the fourth IoT management platform through an interface between the IoT cloud platform and the fourth IoT management platform. In some embodiments, the fourth set of configurations associating the third transaction and the second IoT device follows conventions of an abstraction layer that describes the plurality of IoT device controllers using (i) a set of common attributes or parameters corresponding to aspects that are common to the plurality of IoT device controllers and (ii) a set of pluggable attributes or parameters corresponding to aspects that are unique to each IoT device controller.

Figure 11H:
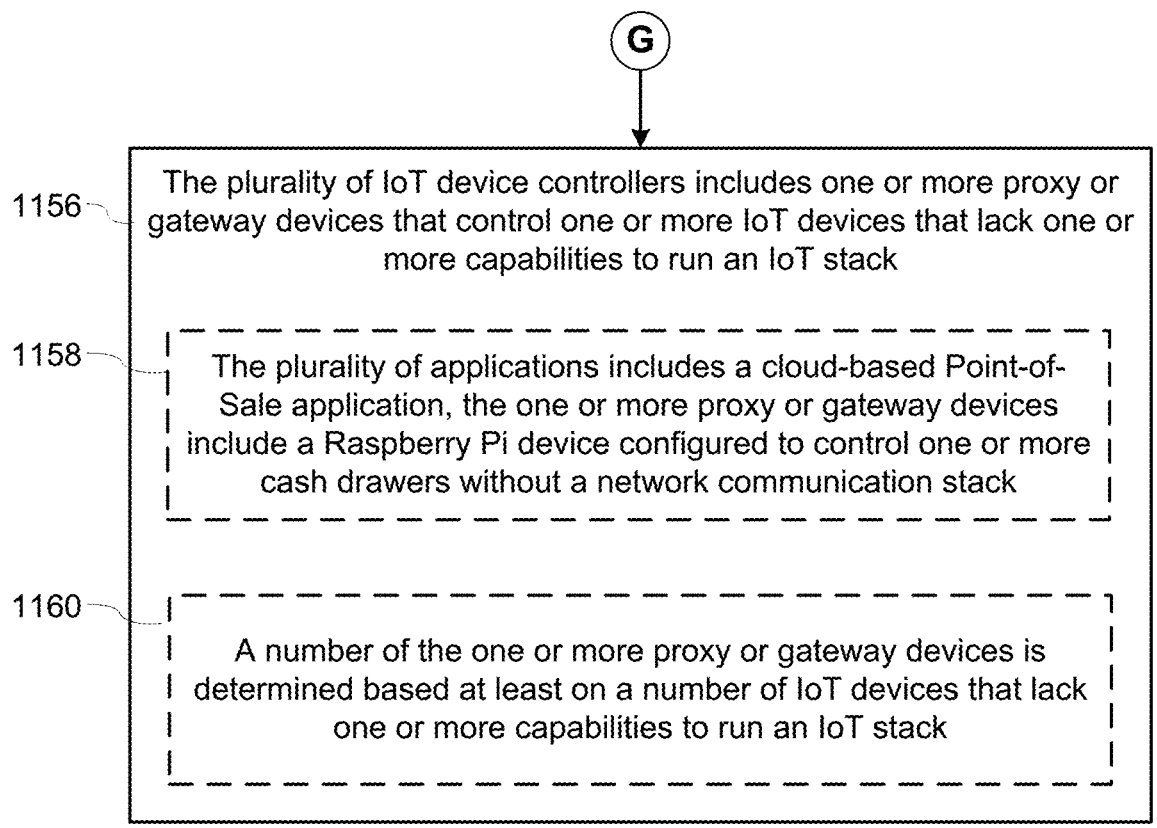

Referring next to FIG. 11H, in some embodiments, the plurality of IoT device controllers includes (1156) one or more proxy or gateway devices that control one or more IoT devices that lack one or more capabilities to run an IoT stack. In some embodiments, the plurality of applications includes (1158) a cloud-based Point-of-Sale application, and the one or more proxy or gateway devices include a Raspberry Pi device configured to control one or more cash drawers without a network communication stack. In some embodiments, a number of the one or more proxy or gateway devices is determined (1160) based at least on a number of IoT devices that lack one or more capabilities to run an IoT stack.

Figure 11I:
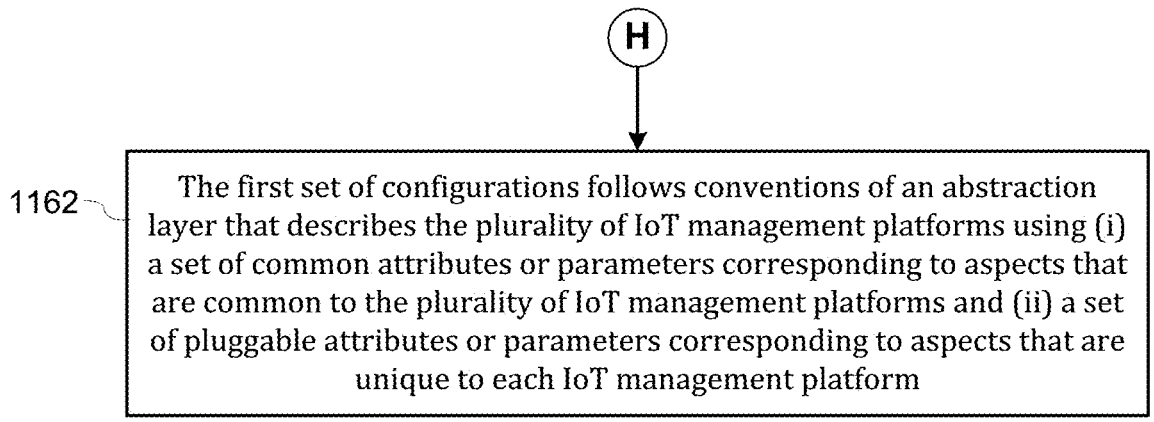

Referring next to FIGS. 11I, in some embodiments, the first set of configurations follows (1162) conventions of an abstraction layer that describes the plurality of IoT management platforms using (i) a set of common attributes or parameters corresponding to aspects that are common to the plurality of IoT management platforms and (ii) a set of pluggable attributes or parameters corresponding to aspects that are unique to each IoT management platform.

Figure 11J:
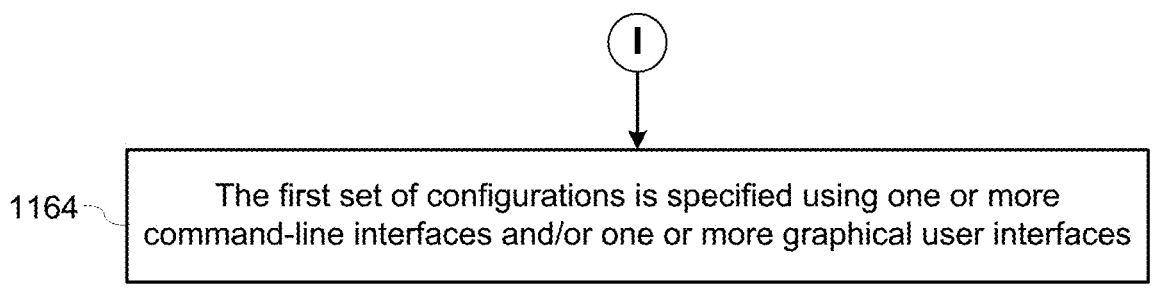

Referring next to FIGS. 11J, in some embodiments, the first set of configurations is specified (1164) using one or more command-line interfaces and/or one or more graphical user interfaces.

Figure 11K:
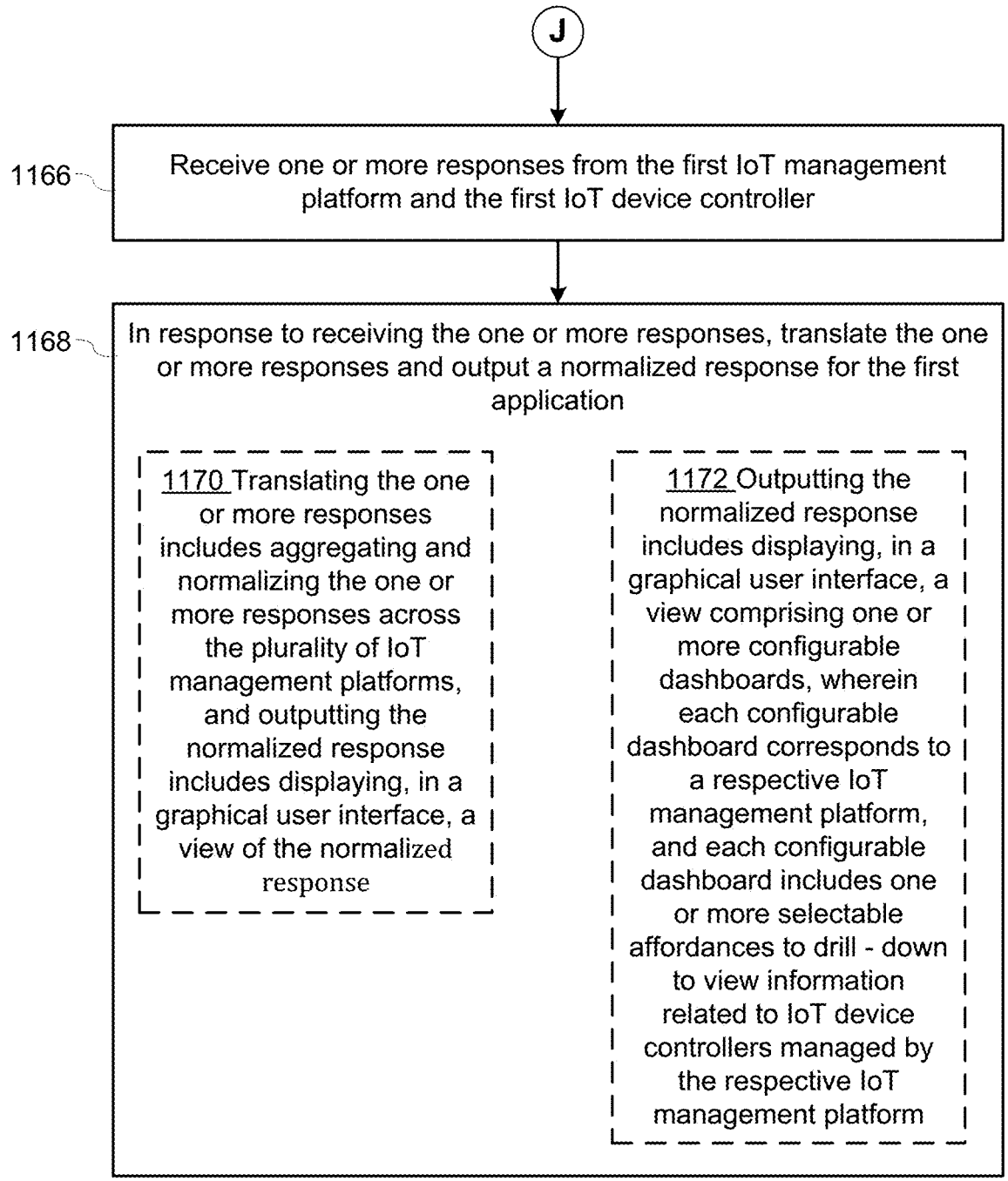

Referring next to FIGS. 11K, in some embodiments, the method further includes receiving (1166) one or more responses from the first IoT management platform and the first IoT device controller, and, in response to receiving the one or more responses, translating the one or more responses and outputting (1168) a normalized response for the first application. In some embodiments, translating the one or more responses includes aggregating and normalizing (1170) the one or more responses across the plurality of IoT management platforms, and outputting the normalized response includes displaying, in a graphical user interface, a view of the normalized response. In some embodiments, outputting the normalized response comprises displaying (1172), in a graphical user interface, a view comprising one or more configurable dashboards. Each configurable dashboard corresponds to a respective IoT management platform, and each configurable dashboard includes one or more selectable affordances to drill-down to view information related to IoT device controllers managed by the respective IoT management platform.

Figure 11L:
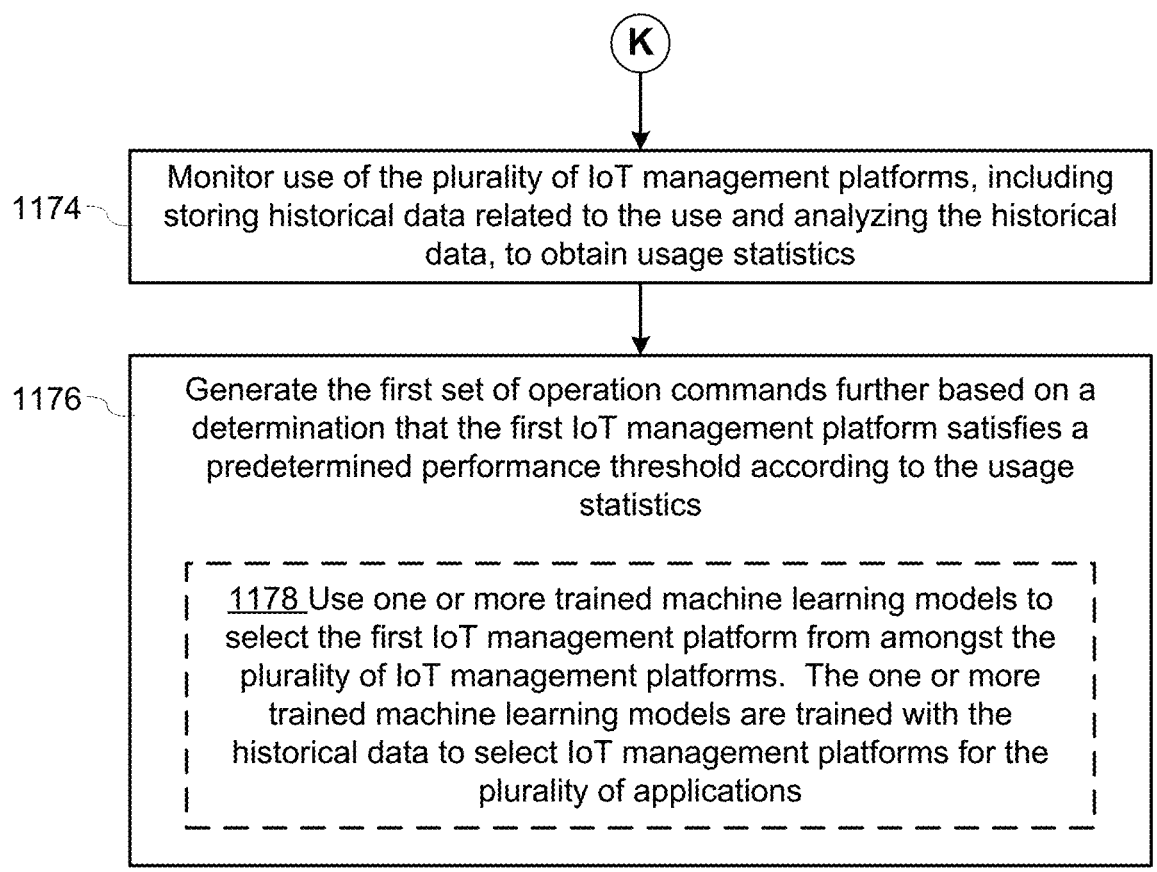

Referring next to FIGS. 11L, in some embodiments, the method further includes monitoring (1174) use of the plurality of IoT management platforms, including storing historical data related to the use and analyzing the historical data, to obtain usage statistics. The first set of operation commands is generated (1176) further based on a determination that the first IoT management platform satisfies a predetermined performance threshold according to the usage statistics. In some embodiments, the method further includes using (1178) one or more trained machine learning models to select the first IoT management platform from amongst the plurality of IoT management platforms, wherein the one or more trained machine learning models are trained with the historical data to select IoT management platforms for the plurality of applications.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method of monitoring and managing Internet of Things (IoT) devices, the method comprising:
   providing a cloud- and device-agnostic IoT cloud platform that (i) concurrently interfaces with a plurality of applications and (ii) concurrently interfaces with a plurality of IoT management platforms, wherein each IoT management platform corresponds to a respective cloud provider and manages one or more IoT device controllers, and each IoT device controller controls a respective IoT device;
   receiving a first request for performing a first transaction corresponding to a first IoT device from a first application;
   in response to receiving the first request, generating a first set of operation commands for performing the first transaction through a first IoT management platform to manage a first IoT device controller that controls the first IoT device, wherein the first set of operation commands is generated based on a first set of configurations associating the first transaction to the first IoT management platform; and
   triggering performance of the first transaction by issuing the first set of operation commands to the first IoT management platform through an interface between the cloud- and device-agnostic IoT cloud platform and the first IoT management platform,
   wherein the first set of configurations follows conventions of an abstraction layer that describes the plurality of IoT management platforms using (i) a set of common attributes or parameters corresponding to aspects that are common to respective cloud providers corresponding to the plurality of IoT management platforms and (ii) a set of pluggable attributes or parameters corresponding to aspects that are unique to a respective cloud provider corresponding to each IoT management platform.

2. The method of claim 1, further comprising:
   in response to receiving the first request, generating a second set of operation commands for performing the first transaction through a second IoT management platform, different from the first IoT management platform, to manage the first IoT device controller that controls the first IoT device, wherein the second set of operation commands is generated based on a second set of configurations associating the first transaction to the second IoT management platform, the second set of operation commands being different from the first set of operation commands in accordance with a difference between the first set of configurations and the second set of configurations; and
   triggering performance of the first transaction by issuing the second set of operation commands to the second IoT management platform through an interface between the cloud- and device-agnostic IoT cloud platform and the second IoT management platform.

3. The method of claim 2, wherein triggering performance of the first transaction by issuing the first set of operation commands and triggering performance of the first transaction by issuing the second set of operation commands are respectively performed in response to two separate run-time requests for performing the first transaction.

4. The method of claim 2, wherein triggering performance of the first transaction by issuing the first set of operation commands and triggering performance of the first transaction by issuing the second set of operation commands are respectively performed in response to a single run-time request for performing the first transaction.

5. The method of claim 2, wherein generating the first set of operation commands and generating the second set of operation commands are respectively performed in response to a single configuration request for setting up the first transaction on the cloud- and device-agnostic IoT cloud platform.

6. The method of claim 2, wherein generating the first set of operation commands and generating the second set of operation commands are respectively performed in response to a single run-time request for performing the first transaction.

7. The method of claim 1, further comprising:
   displaying one or more dashboards, in a graphical user interface, wherein each dashboard displays respective data related to one or more of the plurality of IoT management platforms; and
   displaying one or more affordances, in the graphical user interface, configured to select a respective IoT management platform of the plurality of IoT management platforms for performing a respective transaction,
   wherein the first set of operation commands is generated further based on detecting user selection of a first affordance corresponding to the first IoT management platform in the graphical user interface.

8. The method of claim 1, further comprising:
receiving a second request for ceasing or reversing performance of the first transaction corresponding to the first IoT device from the first application;
in response to receiving the second request, generating a third set of operation commands for ceasing or reversing performance of the first transaction, wherein the third set of operation commands is generated based on a respective set of configurations associating the first transaction to a respective IoT management platform of the plurality of IoT management platforms; and
causing the respective IoT management platform to cease or reverse performance of the first transaction by issuing the third set of operation commands to the respective IoT management platform through a respective interface between the cloud- and device-agnostic IoT cloud platform and the respective IoT management platform.

9. The method of claim 8, wherein the second request is for ceasing performance of the first transaction, and the respective IoT management platform is the first IoT management platform through which the first set of operation commands were issued to trigger performance of the first transaction.

10. The method of claim 8, wherein the second request is for reversing performance of the first transaction, and the respective IoT management platform is a second IoT management platform that is distinct from the first IoT management platform through which the first set of operation commands were issued to trigger performance of the first transaction.

11. The method of claim 1, further comprising:
receiving a third request for performing a second transaction, distinct from the first transaction, corresponding to the first IoT device from the first application;
in response to receiving the third request, generating a fourth set of operation commands for performing the second transaction through the first IoT management platform, wherein the fourth set of operation commands is generated based on a third set of configurations associating the second transaction to the first IoT management platform, wherein the first set of configurations and the third set of configurations include a common subset of configurations and one or more different configurations; and
triggering performance of the second transaction by issuing the fourth set of operation commands to the first IoT management platform through the interface between the cloud- and device-agnostic IoT cloud platform and the first IoT management platform.

12. The method of claim 1, wherein the first transaction comprises repeated actions occurring over a respective IoT management platform during a period of time, and wherein the method further comprises:
determining if the first IoT management platform has reached a first predefined capacity threshold; and
in accordance with a determination that the first IoT management platform has reached the first predefined capacity threshold:
generating a fifth set of operation commands for ceasing or pausing performance of the first transaction, wherein the fifth set of operation commands is generated based on the first set of configurations associating the first transaction to the first IoT management platform; and
causing the first IoT management platform to cease or pause performance of the first transaction by issuing the fifth set of operation commands to the first IoT management platform through the interface between the cloud- and device-agnostic IoT cloud platform and the first IoT management platform; and
triggering performance of the first transaction by issuing a sixth set of operation commands, distinct from the first set of operation commands, to a third IoT management platform, distinct from the first IoT management platform, through an interface between the cloud- and device-agnostic IoT cloud platform and the third IoT management platform, wherein the sixth set of operation commands is generated based on a fourth set of configurations associating the first transaction to the third IoT management platform.

13. The method of claim 1, further comprising:
receiving a fourth request for performing a third transaction corresponding to a second IoT device, distinct from the first IoT device, from the first application;
in response to receiving the fourth request, generating a seventh set of operation commands for performing the third transaction through a fourth IoT management platform, wherein the seventh set of operation commands is generated based on a fourth set of configurations associating the third transaction to the second IoT device; and
triggering performance of the third transaction by issuing the seventh set of operation commands to the fourth IoT management platform through an interface between the IoT cloud platform and the fourth IoT management platform.

14. The method of claim 1, wherein the one or more IoT device controllers include one or more proxy or gateway devices that control one or more IoT devices that lack one or more capabilities to run an IoT stack.

15. The method of claim 14, wherein number of the one or more proxy or gateway devices is determined based at least on number of IoT devices that lack one or more capabilities to run an IoT stack.

16. The method of claim 1, further comprising:
receiving one or more responses from the first IoT management platform and the first IoT device controller; and
in response to receiving the one or more responses, translating the one or more responses and outputting a normalized response for the first application.

17. The method of claim 16, wherein translating the one or more responses includes aggregating and normalizing the one or more responses across the plurality of IoT management platforms, and outputting the normalized response includes displaying, in a graphical user interface, a view of the normalized response.

18. A computer system, comprising:
one or more processors; and
memory;
wherein the memory stores one or more programs configured for execution by the one or more processors, and the one or more programs comprising instructions for:
providing a cloud- and device-agnostic Internet of Things (IoT) cloud platform that (i) concurrently interfaces with a plurality of applications and (ii) concurrently interfaces with a plurality of IoT management platforms, wherein each IoT management platform corresponds to a respective cloud provider and manages one or more IoT device controllers, and each IoT device controller controls a respective IoT device;

receiving a first request for performing a first transaction corresponding to a first IoT device from a first application;

in response to receiving the first request, generating a first set of operation commands for performing the first transaction through a first IoT management platform to manage a first IoT device controller that controls the first IoT device, wherein the first set of operation commands is generated based on a first set of configurations associating the first transaction to the first IoT management platform; and triggering performance of the first transaction by issuing the first set of operation commands to the first IoT management platform through an interface between the cloud- and device-agnostic IoT cloud platform and the first IoT management platform, wherein the first set of configurations follows conventions of an abstraction layer that describes the plurality of IoT management platforms using (i) a set of common attributes or parameters corresponding to aspects that are common to respective cloud providers corresponding to the plurality of IoT management platforms and (ii) a set of pluggable attributes or parameters corresponding to aspects that are unique to a respective cloud provider corresponding to each IoT management platform.

19. A non-transitory computer readable storage medium storing one or more programs configured for execution by a computer system having a display, one or more processors, and memory, the one or more programs comprising instructions for:

providing a cloud- and device-agnostic Internet of Things (IoT) cloud platform that (i) concurrently interfaces with a plurality of applications and (ii) concurrently interfaces with a plurality of IoT management platforms, wherein each IoT management platform corresponds to a respective cloud provider and manages one or more IoT device controllers, and each IoT device controller controls a respective IoT device;

receiving a first request for performing a first transaction corresponding to a first IoT device from a first application;

in response to receiving the first request, generating a first set of operation commands for performing the first transaction through a first IoT management platform to manage a first IoT device controller controlling the first IoT device, wherein the first set of operation commands is generated based on a first set of configurations associating the first transaction to the first IoT management platform; and triggering performance of the first transaction by issuing the first set of operation commands to the first IoT management platform through an interface between the cloud- and device-agnostic IoT cloud platform and the first IoT management platform, wherein the first set of configurations follows conventions of an abstraction layer that describes the plurality of IoT management platforms using (i) a set of common attributes or parameters corresponding to aspects that are common to respective cloud providers corresponding to the plurality of IoT management platforms and (ii) a set of pluggable attributes or parameters corresponding to aspects that are unique to a respective cloud provider corresponding to each IoT management platform.

20. The method of claim 1, wherein each IoT management platform is a cloud platform that is separate and distinct from the one or more IoT device controllers.

21. The method of claim 1, wherein the set of pluggable attributes or parameters is based on problem class, cloud provider, and device type.

* * * * *